July 11, 1967　　A. S. ZERFAHS ETAL　　3,330,179
AUTOMATIC PHOTOCOPYING APPARATUS
Filed May 11, 1964　　11 Sheets-Sheet 1

INVENTORS
ARTHUR S. ZERFAHS
EUGENE S. ECKELS
RONALD A. GLASER
STEVEN MIHOJEVICH

ATTORNEYS

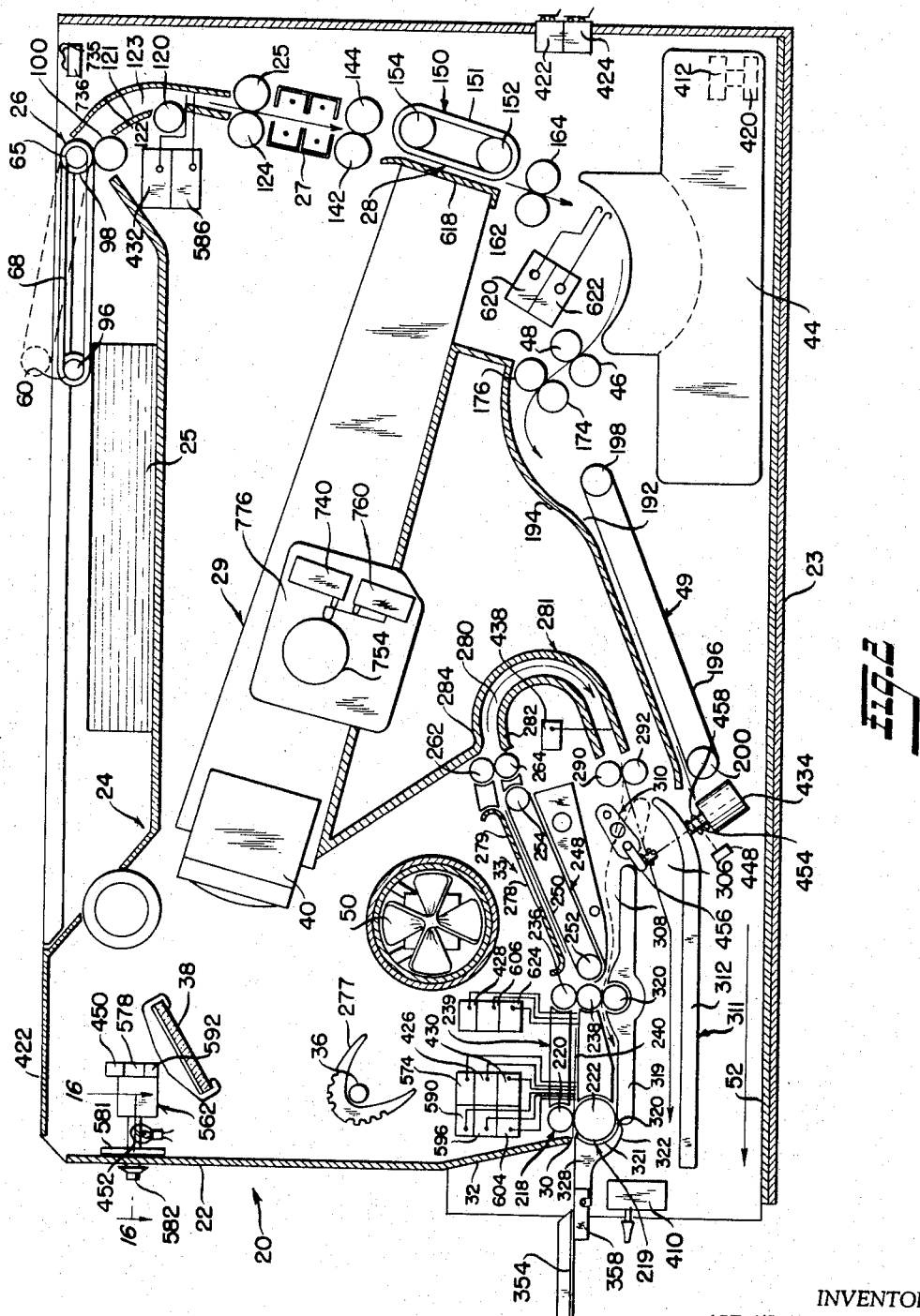

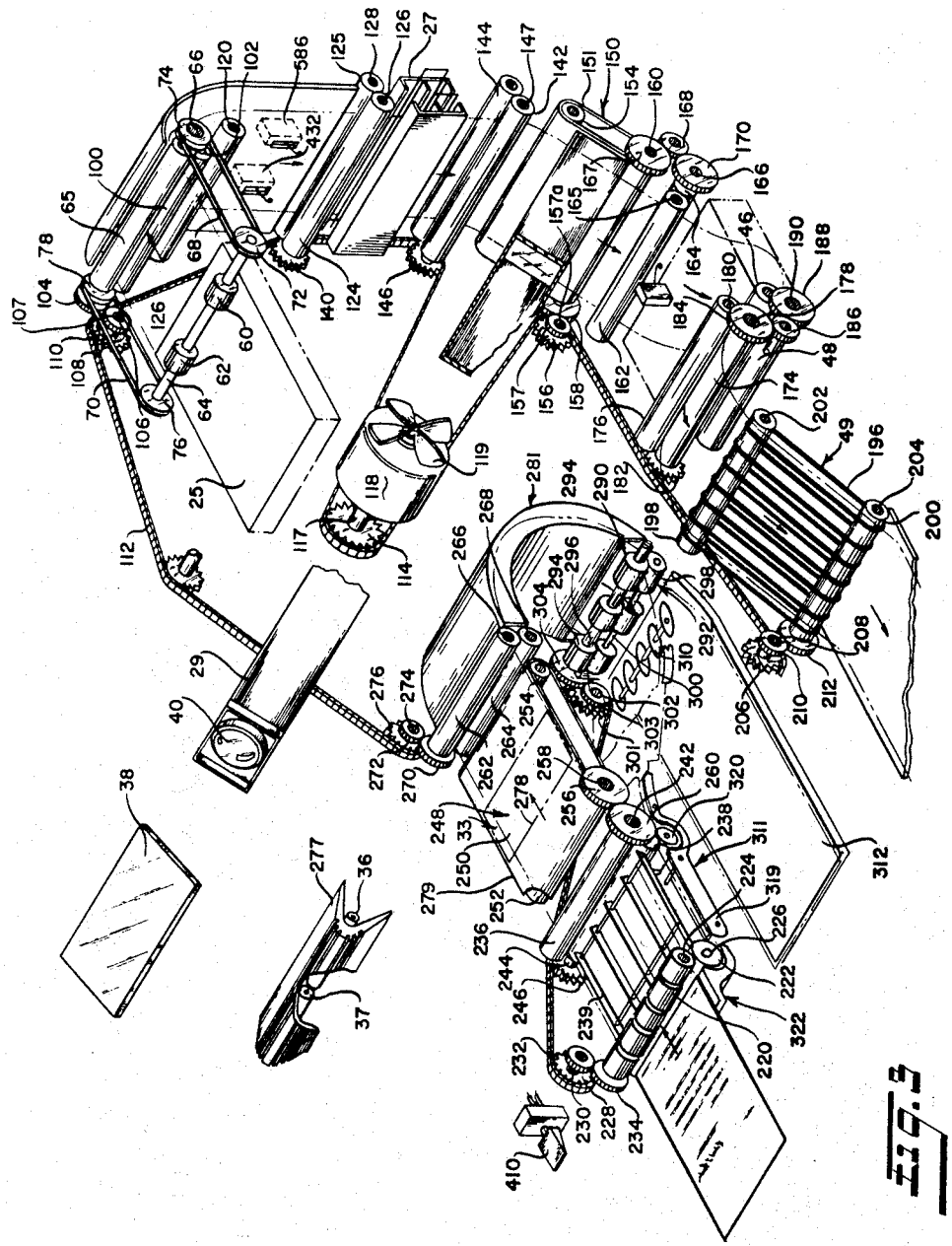

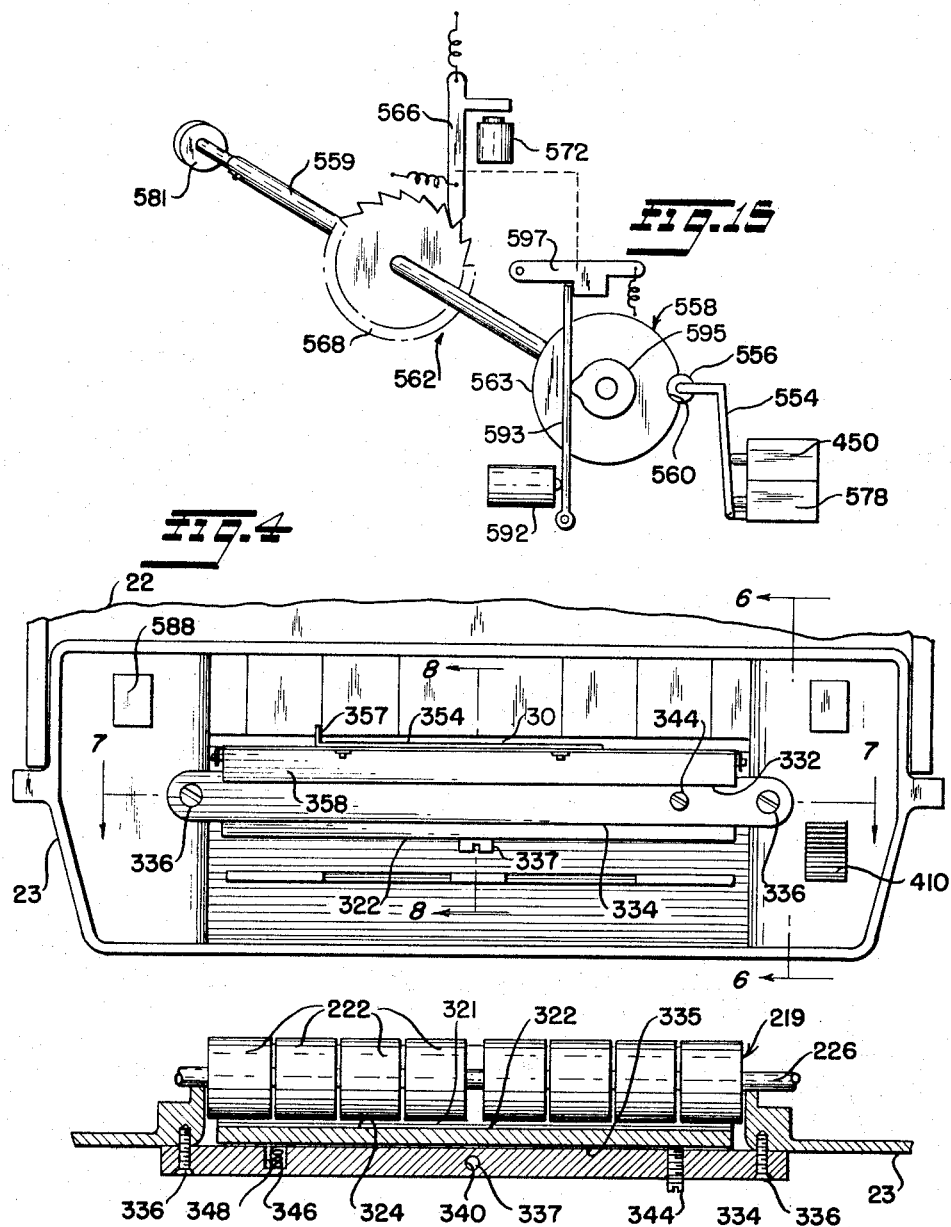

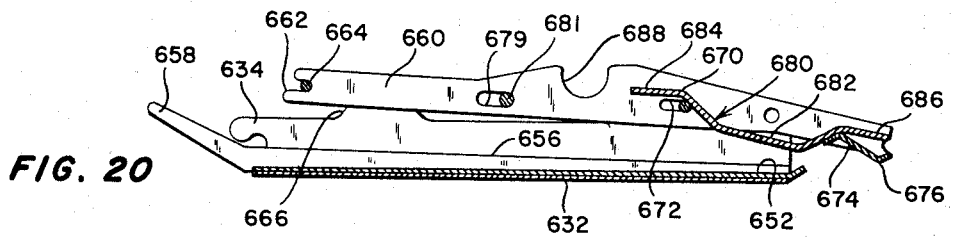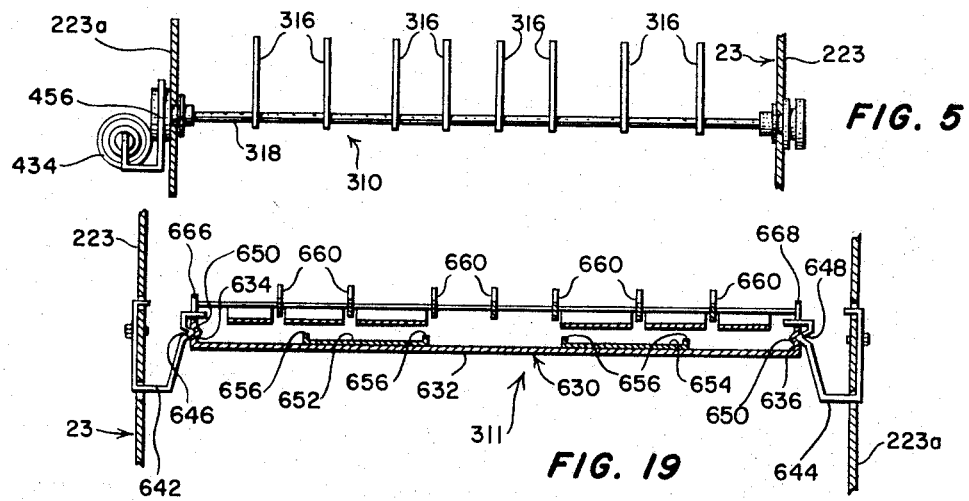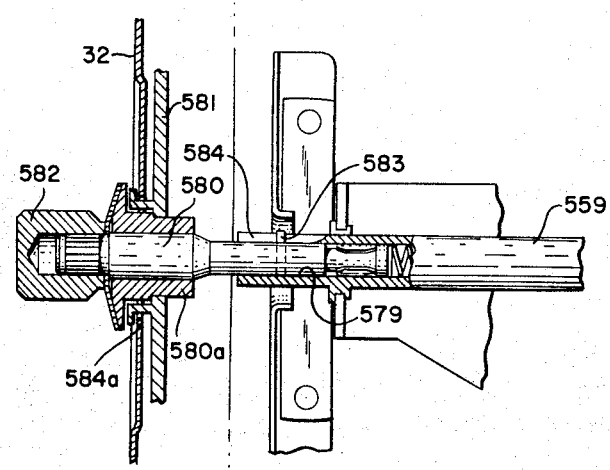

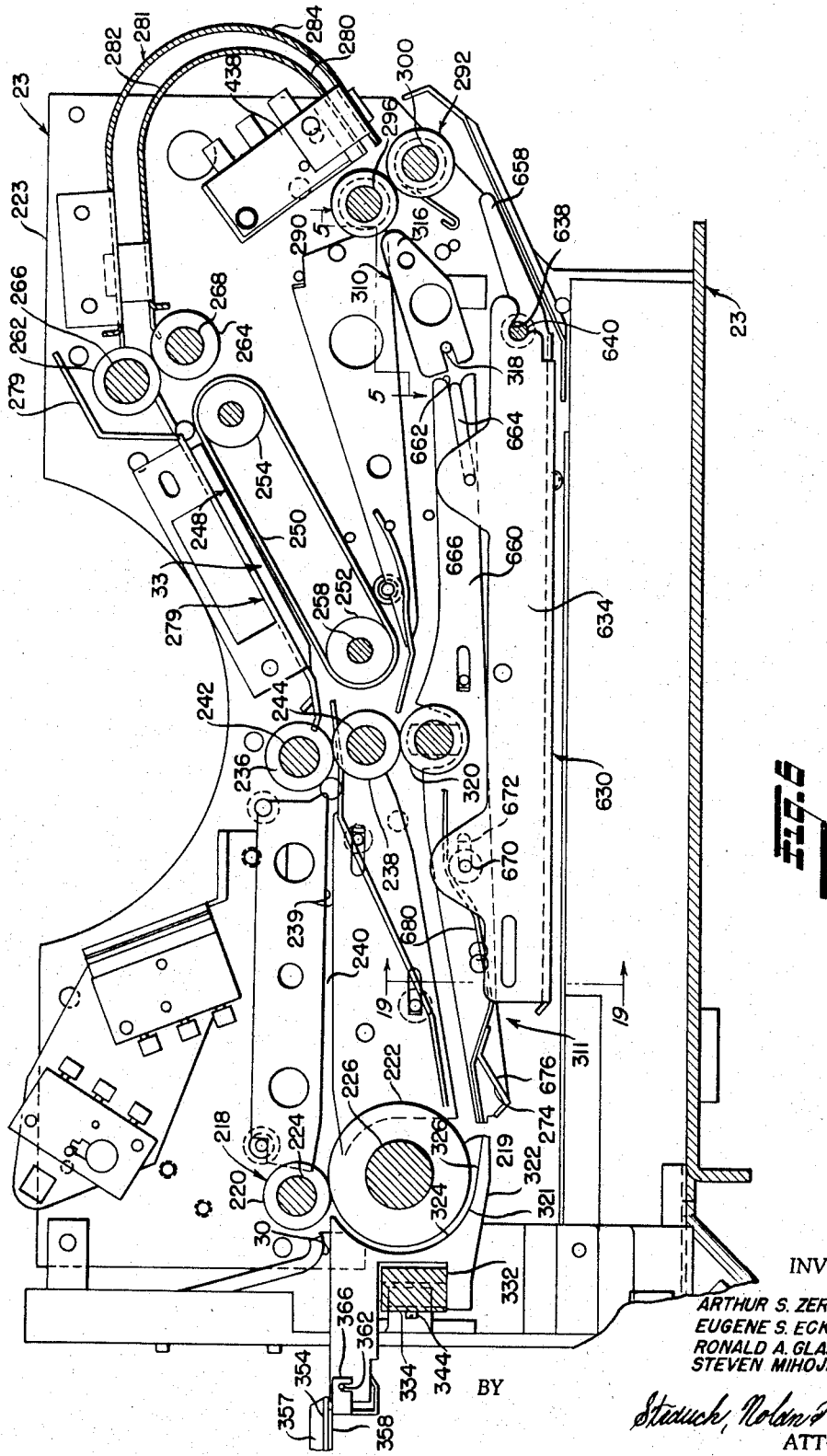

July 11, 1967  A. S. ZERFAHS ETAL  3,330,179
AUTOMATIC PHOTOCOPYING APPARATUS
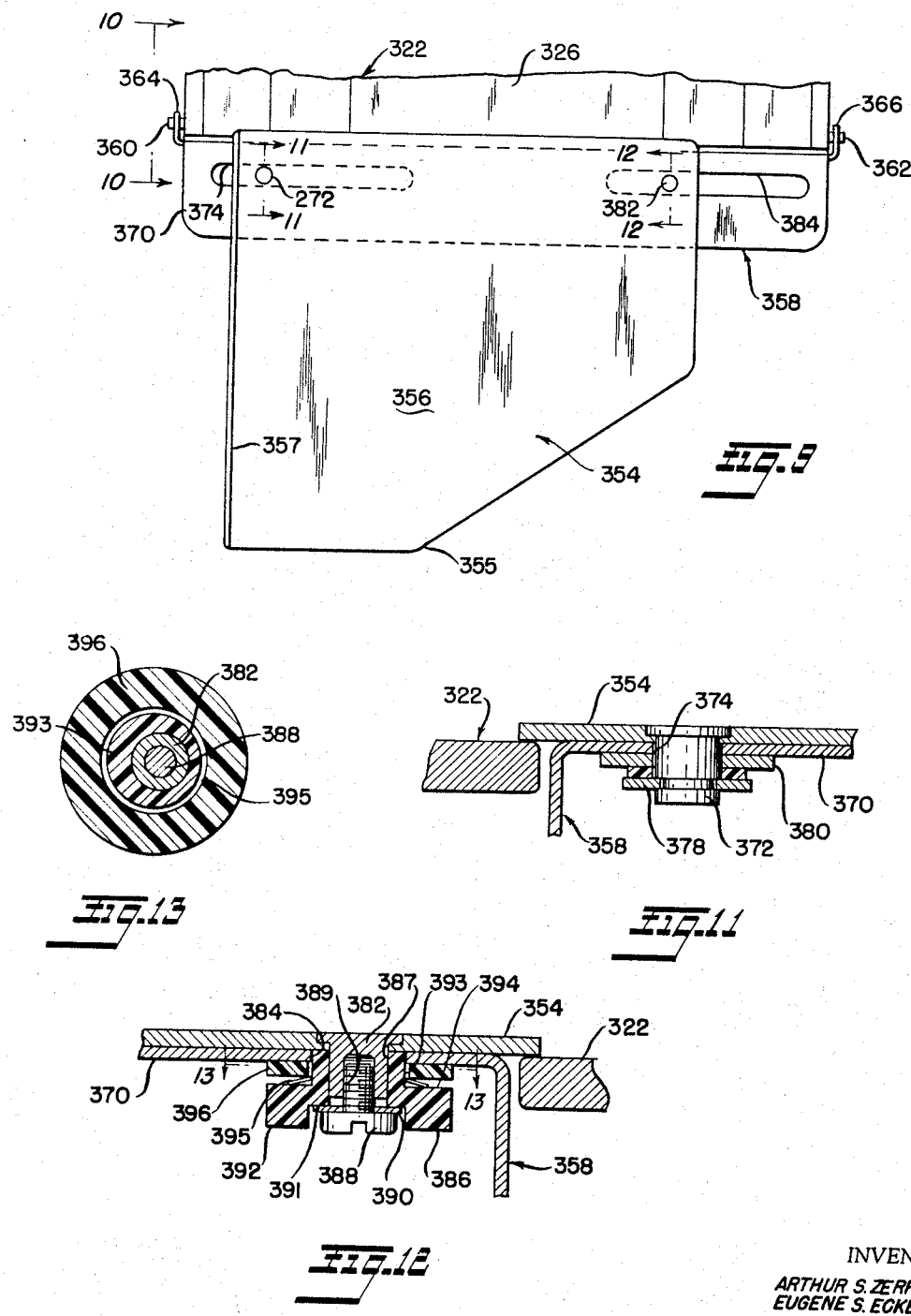
INVENTORS
ARTHUR S. ZERFAHS
EUGENE S. ECKELS
RONALD A. GLASER
STEVEN MIHOJEVICH
BY
*Strouch, Nolan & Neale*
ATTORNEYS

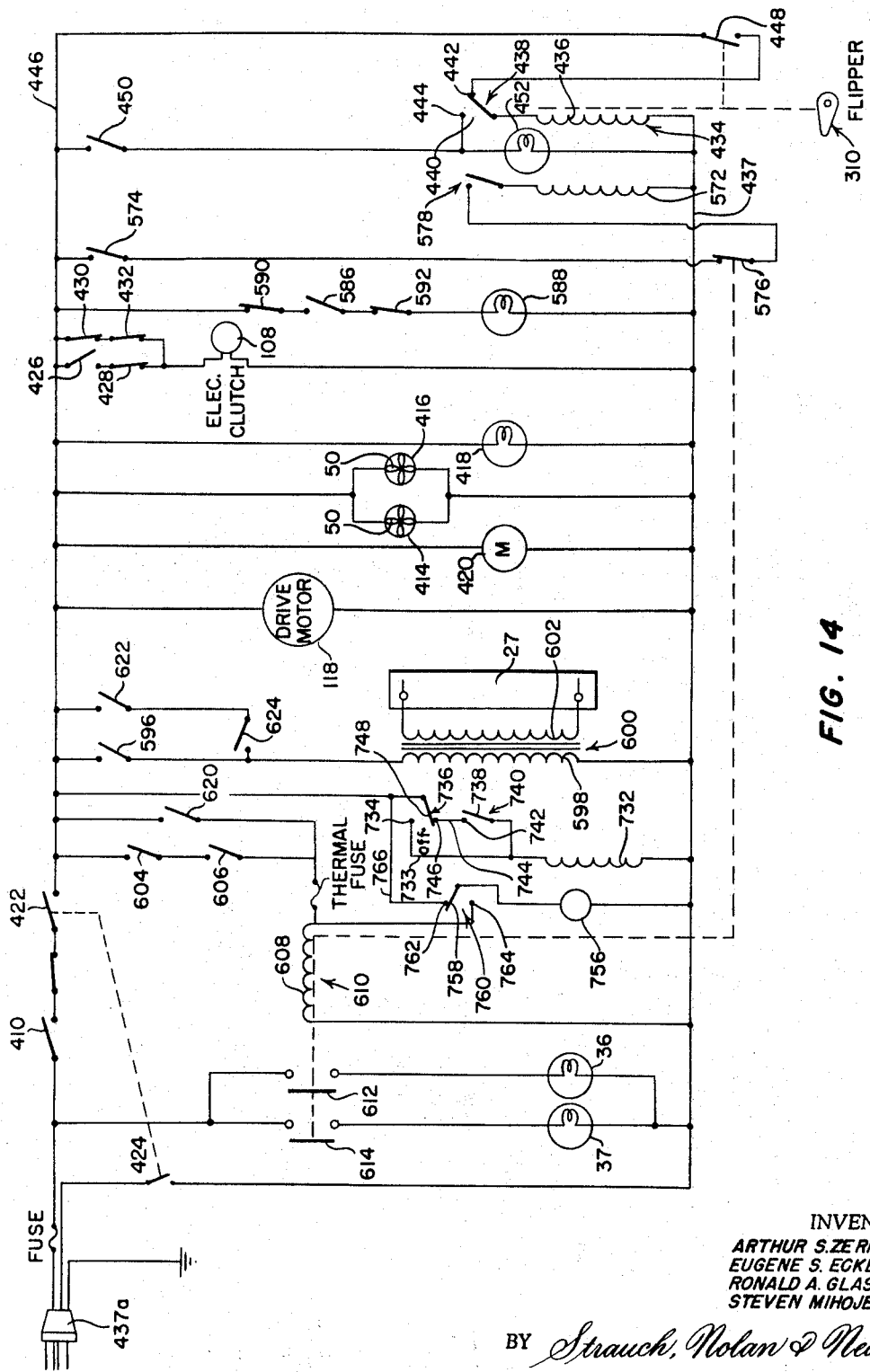

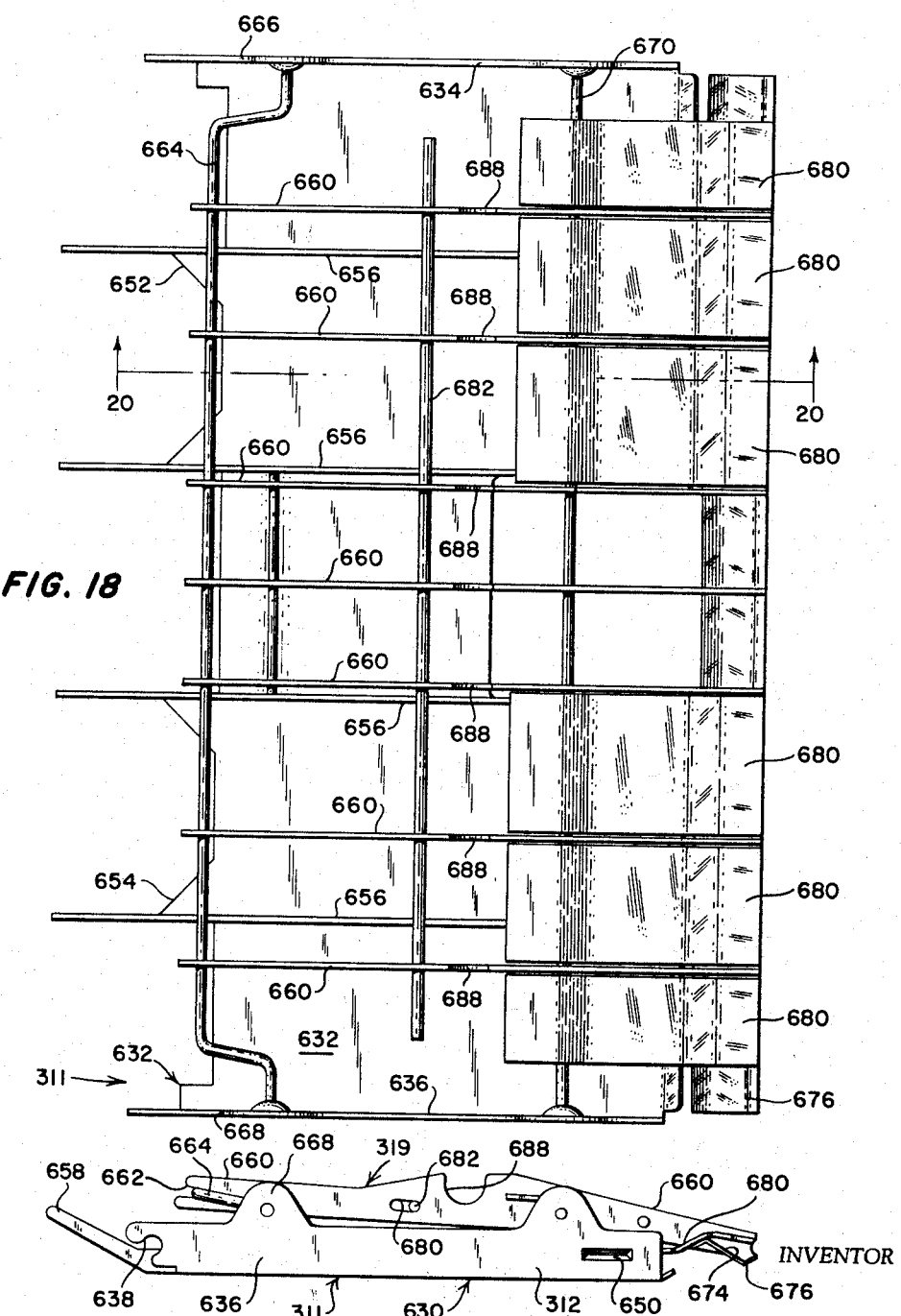

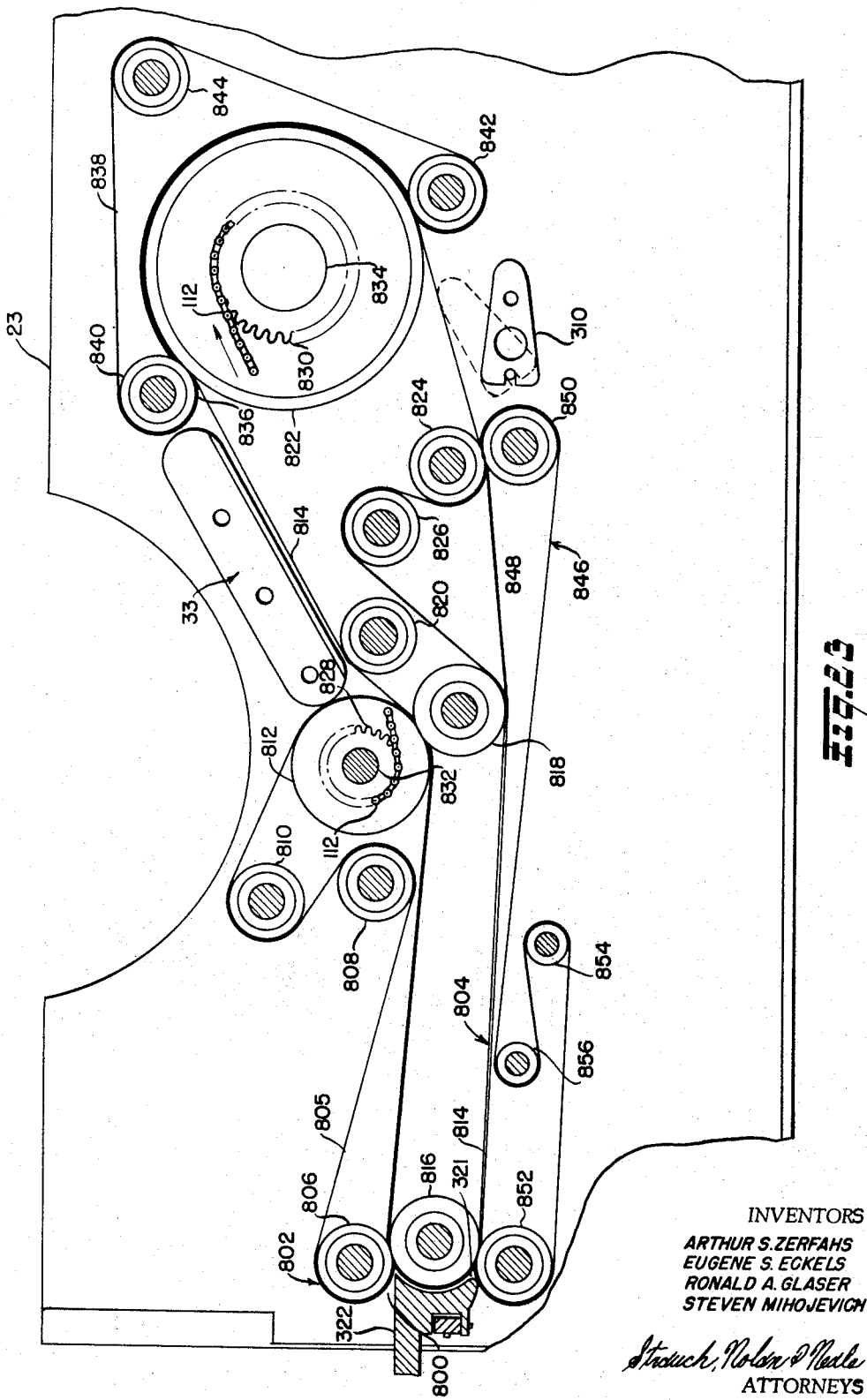

3,330,179
AUTOMATIC PHOTOCOPYING APPARATUS

Arthur S. Zerfahs, Chicago, Eugene S. Eckels, Highland Park, Ronald A. Glaser, Arlington Heights, and Steven Mihojevich, Northbrook, Ill., assignors to SCM Corporation, New York, N.Y., a corporation of New York
Filed May 11, 1964, Ser. No. 366,268
32 Claims. (Cl. 88—24)

This invention relates to duplicating machines and is especially concerned with duplicating apparatus for automatically making multiple copies of an original document.

The invention herein is especially useful in conjunction with photocopying apparatus of the electrostatic type and will be described in its preferred embodiment as applied to an electrostatic printer. It will be understood by those skilled in the art, however, that certain aspects of the invention, especially with respect to the production of a series of copies from a single original document, may be applied with equal advantage to numerous other types of duplicating machines.

In office type duplicating machines in wide use today of the type where the original document to be copied is fed into the machine, there are two types of conveying mechanisms for transporting an original through an exposure or imaging station. One type of conveying mechanism comprises a rotatable copy drum or cylinder to which the original document to be copied is releasably clamped in place for rotation therewith. As the copy drum is rotated, the original document thereon passes through an exposure station in timed relationship with the feeding of a sheet of copy paper through the duplicating machine. This type of rotating carrier is described in United States Letters Patent 3,100,112 issued to H. C. Davis et al. on Aug. 6, 1963, and entitled "Document Feed Mechanism."

A second type of conveyor mechanism for transporting an original document to be copied through an exposure or imaging station incorporates power driven guides, such as, for example, belts or rollers, which transport the original document along a continuous path passing through the exposure station. A duplicating machine incorporating this second type of conveyor mechanism is described in United States Letters Patent 3,091,169 issued to J. Taini et al. on Mar. 28, 1963, and entitled "Automatic Photoprinting Machine." Another duplicating machine incorporating the second type of conveyor mechanism is disclosed in copending United States application Ser. No. 249,248 of Ralph G. Ostensen, filed Jan. 3, 1963, and now abandoned, for an Electrostatic Printer.

In the photoprinting apparatus disclosed in the aforesaid Taini et al. patent, belts are used to form a substantially closed path for routing a document to be copied through an exposure station. In the aforesaid application Ser. No. 249,248, guide rollers are used in place of belts. In both of these belt and roller guide conveyors, the document is not clamped or secured to the guides, but is impelled through the guide path by driving the belts or rollers with a motor. As a result, belt or roller guide conveyors are preferred over the type of conveyor mechanism incorporating a rotating drum since, inter alia, the problem of properly aligning and then clamping the original document on the copy drum is eliminated. With duplicating machines incorporating a copy drum, however, once the original document is properly aligned and clamped on the rotating drum, multiple copies are easily produced by successively feeding sheets of copy paper into the machine in timed relationship with the rotation of the copy drum.

The apparatus described in the aforesaid Taini et al. patent also is operable to produce multiple copies by selectively actuating a gate to either recycle the original document past the exposure station or to eject it from the machine. With the document belt conveyor of the type employed in said Taini et al. patent, however, it has been observed that the document tends to turn or to become skewed with respect to its direction of travel as it is recycled that the angle of skew progressively increases in accordance with the number of times the original document is recycled, or, more particularly, the distance that the document travels before being ejected from the machine. When the document to be copied becomes skewed, the image on the copy paper will be objectionably skewed and hence misaligned. Belt conveyors, such as that employed in the Taini et al. patent, also are undesirable to some extent in electrostatic printing machines since they tend to accumulate an objectionable electrostatic charge that adds to the degradation of the position of the recycled document as it advances through its intended path and may cause the document to stick to a part in the machine or to otherwise jam and fail to properly eject from the paper handling system.

While roller conveyors of the type disclosed in the aforesaid application Ser. No. 249,248 operate satisfactorily where a single copy of a document is made, it has been found that generally the original document cannot be recycled a large number of times for the principal reason that small variations in the dimensions of the paper guide parts, such as the diameters of the rollers, resulting from unavoidable manufacturing tolerances, also contribute to the causes that make the traveling document turn or to become skewed. Owing to these problems it is clear that while prior art duplicating machines employing the second type of document conveyor mentioned above are reasonably suitable for making single copies and have certain advantages over duplicating machines incorporating copy drums, they generally are not satisfactory for producing multiple copies and particularly for producing more than about seven or eight copies.

Accordingly, a primary object of this invention is to provide a novel automatic duplicating machine which is not subjected to the foregoing disadvantages of prior machines in making multiple copies of an original document.

More particularly, it is the object of this invention to provide an improved automatic duplicating machine of the type which has a novel document guide structure for eliminating the skew of the document to be copied as it is recycled in making multiple copies.

A more specific object of this invention is to provide an automatic duplicating machine with a novel document guide structure having a turn around deflector which is adjustable to eliminate the skew of the document as it is recycled in the process of making multiple copies.

A further object of this invention is to provide a novel document guide structure for minimizing the objectionable accumulation of electrostatic charges which tend to attract the traveling paper, causing it to become skewed or jammed in the duplicating machine. According to a preferred embodiment of the present invention, this novel guide structure is employed in a duplicating machine in which an original document is selectively capable of being recycled to produce multiple copies. The guide structure is removably mounted in the machine and defines separate guide paths for either recycling or ejecting the document. If a document does become jammed in the duplicating machine, the guide structure is easily and quickly removable by the operator to provide access to the jammed document, thus permitting resumption of normal operation without objectionable delay.

Still another object of this invention is to provide a duplicating machine with a novel sequencing and control circuit for automatically recycling an original document and for synchronizing the feeding of sheets of copy paper with the recycling document to produce multiple copies.

Still a further object of this invention is to provide a novel, adjustably mounted feed shelf for assisting an operator in properly aligning a document and in feeding it into a duplicating machine.

A yet further object is to provide a novel means for automatically replenishing the developer that is responsive to the length of copy paper that passes through the printer.

Further objects of the invention will presently appear as the description proceeds in connection with the appended claims and the annexed drawings wherein:

FIGURE 2 is a partially schematic longitudinal sectional view taken substantially along lines 2—2 of FIGURE 1;

FIGURE 3 is an exploded perspective view as seen from the front, right corner of the printer of FIGURE 1 with the casing removed;

FIGURE 4 is a fragmentary front elevation of the printer shown in FIGURE 1;

Figure 8:
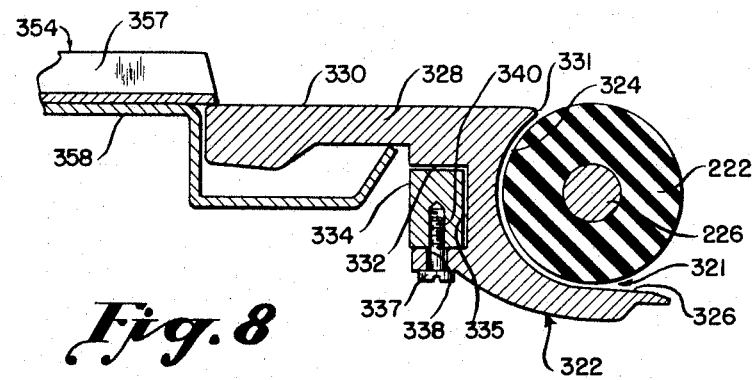
Figure 1:
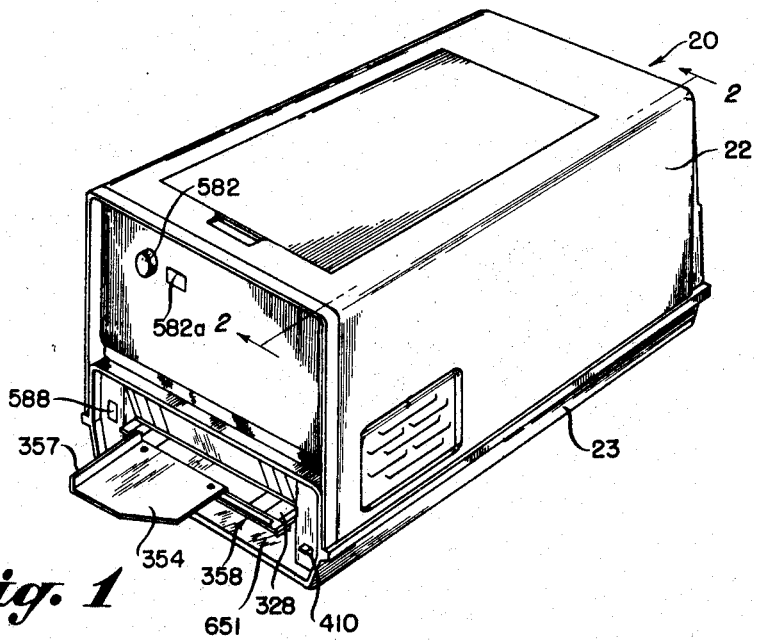
FIGURE 1 is a perspective view of the electrostatic printer of this invention as seen from the front, right corner.
Figure 10:
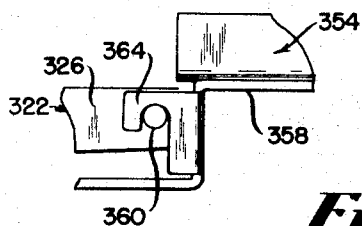
Figure 22:
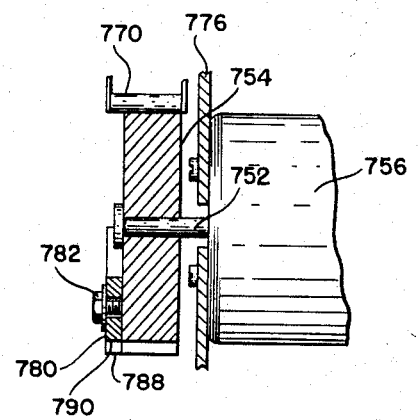
Figure 21:
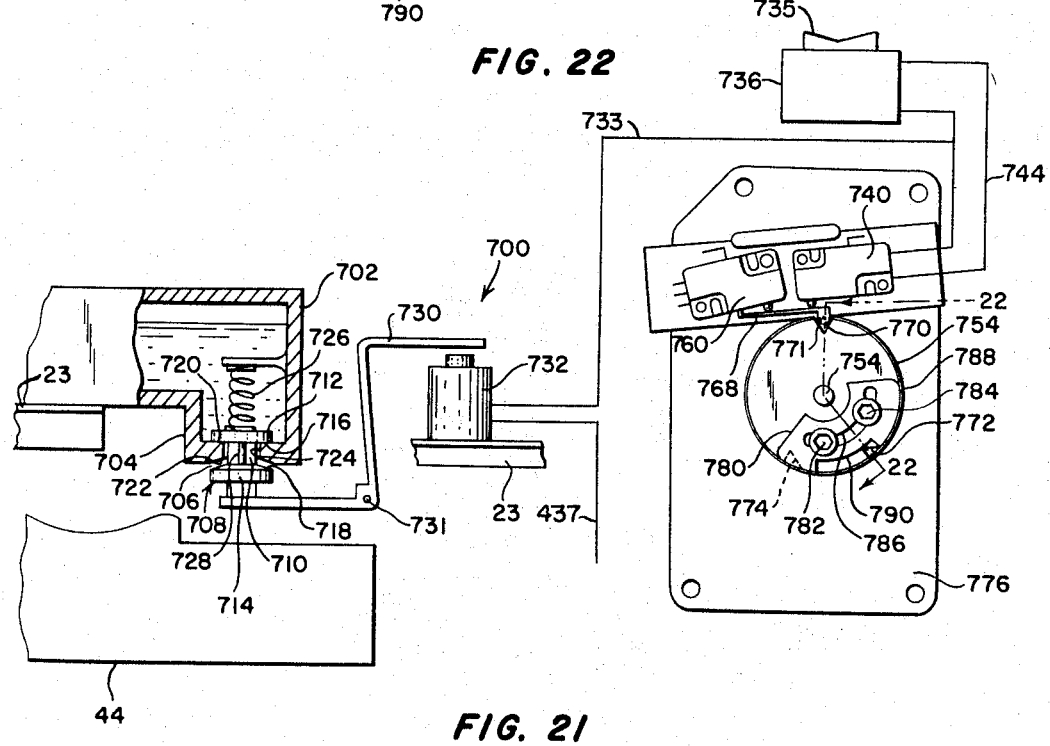

FIGURES 5 and 6 are sections taken respectively along lines 5—5 and lines 6—6 of FIGURE 4;

FIGURE 7 is a section taken substantially along lines 7—7 of FIGURE 6 and illustrating details of the adjustable front turn-around guide and support structure therefor;

FIGURE 8 is a section taken substantially along lines 8—8 of FIGURE 6;

FIGURE 9 is a fragmentary plan view of the printer shown in FIGURE 1 and illustrating the adjustable document feed shelf and supporting structure therefor;

FIGURES 10, 11 and 12 are sections respectively taken along lines 10—10, lines 11—11 and lines 12—12 of FIGURE 9;

FIGURE 13 is a section taken substantially along lines 13—13 of FIGURE 12;

FIGURE 14 is a schematic diagram of the sequencing and control circuit for the printer shown in FIGURE 1;

FIGURE 15 is a perspective, partially schematic view of the selector dial drive mechanism shown in FIGURE 2 for conditioning the printer of this invention to automatically make a selected number of copies from a single original document;

FIGURE 16 is a section taken substantially along lines 16—16 of FIGURE 2;

FIGURE 17 is a side elevation of the removable document guide structure shown in FIGURE 6;

FIGURE 18 is a plan view of the removable document guide structure shown in FIGURE 17;

FIGURE 19 is a section taken substantially along lines 19—19 of FIGURE 6;

FIGURE 20 is a section taken substantially along lines 20—20 of FIGURE 18;

FIGURE 21 is an enlarged partially schematic view of the automatic replenishing system shown in FIGURE 2;

FIGURE 22 is a section taken substantially along lines 22—22 of FIGURE 21; and

FIGURE 23 is a section similar to FIGURE 6 and illustrating a modified document feed and guide construction.

Referring now to the drawings, and more particularly to FIGURES 1 and 2, the reference numeral 20 generally designates an electrostatic printing machine comprising a casing 22 removably mounted on a rigid frame 23. Preferably, casing 22 is slidably mounted on suitable upstanding tracks (not shown) so that it may be raised clear of frame 23 and the structure supported thereon.

Arranged within casing 22 is a copy paper supply compartment 24 comprising a shallow sheet metal tray into which photoconductive paper may be loaded in a stack 25. A paper feed mechanism generally indicated at 26 removes sheets of the copy paper from stack 25 in compartment 24 and transports them one at a time through a corona charging unit 27 where a uniform charge of approximately —400 volts is applied to the surface of the copy paper. From charging unit 27, each sheet of copy paper is fed through an imaging station 28 located adjacent the lower end of an imaging projector 29.

The original document to be copied may be manually inserted through a horizontal slot 30 provided in a panel 32 which forms the front wall of casing 22. The document fed through slot 30 is conveyed through an imaging station 33 by means to be described later on. The copy paper is advanced through its imaging station 28 synchronously and in timed relation to the movement of the document through station 33.

Imaging station 33, as shown in FIGURE 2, is located below the forward end of image projector 29. Light is focused on imaging station 33 as by a pair of projection lamps 36 and 37 (FIGURE 3), and an image is reflected from the surface of the original document into an objective lens 40 of projector 29 by a mirror 38. Lens 40 projects the reflected image onto the surface of the sheet of copy paper passing through its imaging station 28. As the image strikes the copy paper, the charge on the paper is reduced by an amount determined by the intensity of the reflected light. The black portions of the original will reflect such a relatively small light intensity as to affect the charge very little, while the light portions of the original will reflect sufficient light intensity as to almost completely release the latent electrostatic charge on the copy paper as is well known in the art.

With continued reference to FIGURE 2, the exposed copy sheet containing the latent charge pattern is developed to provide a visible image as by being passed through a developing tank 44. A liquid developer contained in tank 44 and having charged particles is applied to the latent image bearing surface of the copy paper. These charged particles, which may have a positive polarity, are attracted to negatively charged areas on the copy sheet to a degree determined by the charge at each region on the surface on the copy paper, thereby producing a graphic image. The copy paper feed mechanism then moves the developed copy paper between squeegee rollers 46 and 48 which remove the excess developer from the copy paper and which, if desired, may provide a direct voltage of relatively low magnitude to control the density of the image and/or the cleanliness of the background of the developed copy paper.

The radiant heat of projection lamps 36 and 37 together with the air warmed by lamps 36 and 37 blown across the copy paper by fans indicated at 50 are effective to remove substantially all of the moisture from the surface of the copy paper. Thereafter, the developed copy paper is discharged by a conveyor 49 onto a tray surface 52 located near the bottom of printer 20 adjacent to panel 32. The sheets of copy paper deposited on surface 52 may be removed by an operator through an opening in panel 32.

With reference now to FIGURES 2 and 3, paper feed 26 may comprise a pair of axially aligned, spaced apart feed rollers 60 and 62 fixed on a shaft 64. Rearwardly of shaft 64 is a feed roller 65 which is fixed on a shaft 66. Shaft 66 is rotatably mounted by unshown bearings on frame 23 in parallel spaced apart relationship to shaft 64 and is drivingly connected thereto by suitable belts 68 and 70. As described in greater detail in said copending application Ser. No. 249,248, shaft 64 is rotatably mounted by suitable bearings (not shown) on a bracket (not shown) which is rockable about the axis of shaft 66, thereby permitting feed rollers 60 and 62 to be swung upwardly to the dotted line position shown in FIGURE 2 for loading copy paper into compartment 24.

As best shown in FIGURE 3, belt 68 extends around pulleys 72 and 74 which are respectively fixed to corresponding ends of shaft 64 and 66. Similarly, belt 70 extends pulleys 76 and 78 respectively fixed to corresponding ends of shaft 64 and 66 on the opposite side from belt 68. With this construction, feed rollers 60 and 62 are driven by shaft 66 through belts 68 and 70. The weight of shaft 64 together with rollers 60 and 62 and pulleys 72 and 76 is sufficient to provide the necessary friction on the upper surface of the copy paper stack 25 to cause the upper sheet in stack 25 to be advanced when shaft 64 is rotated.

With continued reference to FIGURE 3, feed roller 65 frictionally drives a mating feed roller 100 fixed on a shaft 102 to move the copy paper through the printer. Shaft 102 is rotatably mounted by bearings (not shown) in parallel spaced apart relation vertically below shaft 66. Roller 100 is driven by frictional engagement with roller 65.

As best shown in FIGURE 3, a pair of intermeshing spur gears 104 and 106 are respectively fixed on shaft 66 and a rotatably mounted shaft 107. Spur gear 106 comprises the output member of an electromagnetic clutch 108 which is supported in any suitable manner on frame 23. The input member of clutch 108 comprises a further spur gear 110 about which an endless roller drive chain 112 is trained.

With continued reference to FIGURE 3, chain 112 is trained around and driven by a spur gear 114 which is fixed on an output shaft 117 of an electric drive motor 118. As will presently become apparent as the description proceeds, motor 118 is continuously energized when printer 20 is in operation. As a result, when clutch 108 is energized, a drive train is established for transmitting power from motor 118 through drive chain 112, clutch 108, and spur gears 104 and 106 to rotate shaft 66. By rotating shaft 66, torque is transmitted by belts 68 and 70 to rotate shaft 64 with the result that rollers 60 and 62 are revolved in a counterclockwise direction as viewed from FIGURE 2 to advance the top sheet of copy paper in stack 25 toward rollers 65 and 100. As a result of rotating shaft 66, rollers 65 and 100 are revolved in opposite directions for advancing the sheet of copy paper fed from compartment 24 by rollers 60 and 62.

Motor 118 may be mounted by any suitable means (not shown) on frame 23. A fan 119 driven by motor 118 is operative to circulate air through casing 22.

With continued reference to FIGURES 2 and 3, the copy paper advanced by rollers 65 and 100 passes over a rotatably mounted idler roller 120 and between fixed spaced apart deflecting guides 121 and 122 which form a throat 123. The sheet of copy paper advanced by rollers 65 and 100 are turned by guides 122 and 121 to descend downwardly. Idler roller 120 assists the copy paper in moving freely through throat 123 to a pair of pick-up rollers 124 and 125.

With continued reference to FIGURES 2 and 3, pick-up rollers 124 and 125 are respectively fixedly mounted on parallel shafts 126 and 128 which are rotatably supported in bearings (not shown) below throat 123. Fixed to one end of shaft 126 is a spur gear 140 which is engaged by drive chain 112 to continuously rotate pick-up roller 124. Roller 125 is driven by frictional engagement with roller 124.

The copy paper fed through throat 123 is advanced downwardly by pick-up rollers 124 and 125 for transportation through corona unit 27. Below corona unit 27 is a further pair of parallel, rotatable pick-up rollers 142 and 144. Roller 142 is revolved by drive chain 112 which engages a spur gear 146 fixed on one end of a rotatably mounted shaft 147. Roller 142 is mounted on shaft 147 and frictionally drives roller 144.

With continued reference to FIGURES 2 and 3, the copy paper passing through corona unit 27 is advanced by pick-up rollers 142 and 144 to a conveyor 150 which comprises an endless conveyor belt 151 trained around rotatably supported, parallel, spaced apart drive and driven rollers 152 and 154. Belt 151 advances the copy paper through imaging station 28 and maintains the copy paper flat while the image of the original document is projected on it by image projector 29.

As best shown in FIGURE 3, conveyor 150 is continuously driven by chain 112 which is trained over a spur gear 156. A gear 157 fixed on a shaft 157a mounting gear 156 constantly meshes with another gear 158 fixed on the end of a rotatably mounted shaft 160. Roller 152 is mounted on shaft 160 and is revolved by drive chain 112 through the drive train formed by gears 156, 157, and 158.

With continued reference to FIGURES 2 and 3, conveyor 150 guides the copy paper to a further pair of pick-up rollers 162 and 164 respectively fixed on shafts 165 and 166 below roller 152. To continuously revolve roller 162, a spur gear 167 fixedly mounted on one end of shaft 160 meshes with a rotatably supported idler gear 168 which, in turn, meshes with a gear 170. Gear 170 is fixed on one end of shaft 166 to impart rotation to roller 164. Roller 164 is continuously driven by frictional engagement with roller 162.

Pick-up rollers 162 and 164 feed the copy paper downwardly into developing tank 44. As the copy paper leaves developing tank 44, it is picked up and passed through squeegee rollers 46 and 48 which are rotatably supported on frame 23 by suitable bearings (not shown).

From squeegee rollers 46 and 48, the copy paper is advanced between a further pair of pick-up rollers 174 and 176 which are respectively mounted on shafts 178 and 180. Roller 174 is continuously driven by chain 112 which is trained over a spur gear 182 fixed on one end of shaft 178. Roller 176 is driven by frictional engagement with roller 174. A drive train comprising a spur gear 184 fixed on shaft 178 constantly meshes with rotatably mounted idler gear 186 which, in turn, constantly meshes with a gear 188. Gear 188 is fixed on one end of a shaft 190 which mounts squeegee roller 48. Squeegee roller 48 is thus rotated through this drive train and drives roller 46 by frictional engagement therewith.

With continuing reference to FIGURES 2 and 3, the copy paper is advanced by rollers 174 and 176 into a throat 192 defined by conveyor 49 and a fixed metal guide 194. Conveyor 49 comprises a series of endless cords 196 trained around parallel spaced apart rollers 198 and 200 which are respectively fixed on shafts 202 and 204. Conveyor 49 is driven by chain 112 which is trained over a spur gear 206. Gear 206 is fixed to a shaft 208 which is rotatably supported on frame 23 in any suitable manner. A gear 210 fixed on shaft 208 constantly meshes with a gear 212 fixed on shaft 204 so that movement of drive chain 112 imparts rotation to roller 200 to advance cords 196.

As previously described, the copy paper is advanced by conveyor 49 downwardly and forwardly onto tray surface 52 for removal by the operator of the printer. Thus, from the foregoing, it is apparent that the copy paper feed mechanism previously described withdraws a sheet of copy paper from paper supply compartment 24, feeds the sheet of copy paper through corona unit 27 where a uniform charge of approximately —400 volts is imparted to its surface, advances the copy paper through imaging station 28, and then transfers the copy paper to the developing tank 44 from which the copy paper is removed and deposited on surface 52 for removal from the printer.

The printer construction described to this point is conventional and is preferably the same as that disclosed in said copending application Serial No. 249,248.

Referring now to FIGURES 2, 3, and 6 the original document which is inserted through slot 30 for transportation through imaging station 33 is fed between a pair of pick-up roller assemblies 218 and 219 respectively comprising a series of axially spaced apart rollers 220 and 222 extending between parallel, upstanding, spaced apart side panels 223 and 223a (FIGURE 5) forming a part of frame 23. Rollers 220 and 222 are respectively fixed on parallel shafts 224 and 226 which are mounted by suitable bearings (not shown) on frame 23. Rollers 220 are driven by chain 112 which is trained over a spur gear 228. Gear 228 is fixed on a shaft 230 supported on frame 23 by suitable bearings (not shown). A gear 232 fixed on shaft 230 constantly meshes with a gear 234 which is fixed on one end of shaft 224. Advancement of drive chain 112 thus imparts continuous rotation to rollers 220 through the drive train formed by gears 228, 232, and 234.

Rollers 222 are driven by frictional engagement with rollers 220 so that the document to be copied is advanced by rollers 220 and 222 horizontally toward a further pair of pick-up rollers 236 and 238 which are parallel to rollers 220 and 222 and which are separated from rollers 220 and 222 by a metal guide structure 239 suitably fixed in place on frame 23 and defining a document guide path 240 (FIGURE 2) extending horizontally between rollers 220 and 222 and rollers 236 and 238. Pick-up rollers 236 and 238 are respectively fixed on parallel shafts 242 and 244 which are rotatably mounted by suitable bearings (not shown) on frame 23. roller 238 is continuously rotated by drive chain 112 which is trained over spur gear 246 fixed on one end of shaft 244. Roller 236, which is mounted vertically above roller 238, is rotated by frictional engagement with roller 238.

Pick-up rollers 236 and 238 feed the document to be copied onto a conveyor 248 which comprises an endless belt 250 trained around parallel, spaced apart rollers 252 and 254. Belt 250 supports the document to be copied as it passes through imaging station 33 below the forward upper end of image projector 29.

As best shown in FIGURE 3, roller 252 is fixedly mounted on a shaft 258 which is rotatably supported by suitable bearings (not shown) on frame 23. A spur gear 256 fixed on one end of shaft 258 constantly meshes with a spur gear 260 fixed on shaft 242 with the result that advancement of chain 112 continuously rotates roller 252 to drive belt 250. The rearward movement of the document on conveyor belt 250 is synchronized with the movement of the copy sheet on conveyor belt 151 by drive chain 112, and the movement of the copy sheet is co-ordinated by use of feeler switches contained in a control circuit to be described later on.

As the document travels off the rear end of belt 250, it passes between a further pair of pick-up rollers 262 and 264 respectively fixed on parallel shafts 266 and 268 which are rotatably mounted by suitable bearings (not shown) on frame 23. Pick-up roller 262 is driven by a gear 270 fixed on one end of shaft 266 and constantly meshing with a gear 272. Gear 272 is fixed on a shaft 274 which is rotatably mounted on frame 23 and which mounts a spur gear 276. Drive chain 112 is trained over spur gear 276 to continuously revolve roller 262 when motor 118 is energized. Roller 264, which is vertically below roller 262, is driven by frictional engagement with roller 262.

The document conveyed through imaging station 33 is illuminated by projection lamps 36 and 37 which, as shown in FIGURES 2 and 3, may be mounted in a suitable parabolic reflector 277 fixedly supported on frame 23 in such manner as to provide the necessary amount of illumination of the document. The light from projection lamps 36 and 37 is directed through a slot 278 formed in a sheet metal member 279 supported on frame 23 closely adjacent and parallel to the upper run of conveyor belt 250. The image on the document to be copied, as previously explained is reflected from its surface to mirror 38 which is supported at an upwardly and rearwardly inclined angle adjacent the forward end of casing 22.

With continuing reference to FIGURES 2, 3, and 6, the document fed through imaging station 33 is advanced by rollers 262 and 264 into a throat 280 formed by a rear turn around guide 281. Guide 281 comprises forward and rearward arcuate walls 282 and 284 which are fixed on frame 23 in spaced, parallel relationship. As shown, guide 281 deflects the rearwardly moving document into a path traveling toward the front of printer 20.

With continued reference to FIGURES 2, 3, and 6, the copied document is withdrawn from guide 281 by a pair of pick-up roller assemblies 290 and 292. Roller assembly 290 comprises a series of axially aligned, spaced apart feed rollers 294 mounted on a common shaft 296 which is rotatably mounted on frame 23 by suitable bearings (not shown). Roller assembly 292 disposed vertically below roller assembly 290 similarly comprises a series of axially aligned, spaced apart feed rollers 298 fixed on a common shaft 300 which is mounted by suitable bearings (not shown) on frame 23 in parallel relationship with shaft 296.

As best shown in FIGURE 3, rollers 294 are revolved by drive chain 112 which is trained around a spur gear 301 fixed on a rotatably mounted shaft 302. A gear 303 fixed on shaft 302 constantly meshes with a further gear 304 fixedly mounted on one end of shaft 296. Rollers 294 are thus driven by chain 112 through the drive train formed by gears 301, 303, and 304. Rollers 298 are driven by frictional engagement with rollers 294.

In accordance with this invention, the copied document advanced toward the front of printer 20 by roller assemblies 290 and 292 is transferred either into an ejection path 306 or into a recycling path 308 by a gate or flipper 310. Paths 306 and 308 are defined by a novel, removable guide structure 311 to be described in detail later on. The document routed through path 308, as will be explained in greater detail below, is recycled through imaging station 33 for producing multiple copies. The document routed through ejection path 306 is deposited on a tray 312 for removal from printer 20 by the operator. Tray 312 forms a part of guide structure 311 in a manner to be presently described in greater detail.

As best shown in FIGURES 3 and 5 flipper 310 may comprise a series of thin, flat sided metal fingers 316 which are fixedly mounted in parallel uniformly axially spaced apart relationship on a common shaft 318. Shaft 318 is rotatably supported by suitable bearings on frame 23. In accordance with this invention, shaft 318 may either be manually rotated or automatically rotated by means to be described later on to position fingers 316 either in their full line positions or their dotted line positions as shown in FIGURE 2.

Fingers 316 extend from shaft 318 toward the rearward end of printer 20 and terminate closely adjacent to roller assemblies 290 and 292. Shaft 318 is spring biased to position fingers 316 in their full line positions where they are located immediately above the exit throat from roller assemblies 290 and 292. In this position of fingers 316, the document advanced between rollers 294 and 298 is guided under fingers 316 and into ejection path 306 for deposit on tray 312. When fingers 316 are positioned in their dotted line positions, the document advanced by roller assemblies 290 and 292 is guided over fingers 316 and into the recycling path 308.

As best shown in FIGURE 3, fingers 316 are very thin, and the document only engages either the upper edges of fingers 316 when flipper 310 is in its dotted line position or the lower edges of fingers 316 when flipper 310 is in its full line position. As a result, the area of the surfaces of flipper 310 engaging the copied document is minimized, while at the same time providing an adequate guide to keep the document substantially straight and to route it either into path 306 or path 308.

As a result of minimizing the area of the document engagement surfaces on flipper 310, accumulation of electrostatic charges on the guide surfaces of flipper fingers 316 is correspondingly minimized. Accumulations of electrostatic charges on the document conveying surfaces in printer 20 is objectionable since the document is attracted by such charges and consequently tends to stick to the conveying surfaces with the result that it may jam in the printer or become objectionably skewed. Minimization of electrosatic charge accumulations by minimizing the surface area of document engagement on flipper 310 in this invention assures that the document is quickly and easily conveyed into path 306 or path 308 without sticking or jamming in the printer. Guides 239 and 311, FIGURES 6 and 18, are similarly constructed to minimize the effect of static electricity.

As generally shown in FIGURES 2, 3, and 6, guide structure 311 is formed with a specially constructed feed back shelf 319 which guides the original document along path 308 for recycling through imaging station 33. A document routed by flipper 310 into path 308 is fed as by roller assemblies 290 and 292 between roller 238 and a further pick-up roller 320. Roller 320 is driven by frictional engagement with roller 238 and is rotatably mounted vertically below and in parallel relation with roller 238.

With continued reference to FIGURES 2, 3, and 6, a throat 321 is defined by roller 222 and a front turn around guide 322. Guide 322 deflects the forwardly traveling document by turning it upwardly and rearwardly to reverse its direction by approximately 180 degrees and route it into the throat between rollers 220 and 222 where the document again is advanced along path 240 and through imaging station 33. The recycled document thus advanced by rollers 220 and 222 is picked up again by rollers 236 and 238 which feed the document to conveyor 248 for transportation through imaging station 33. In this manner the document may be recycled through imaging station 33 as many times as desired by maintaining flipper 310 in its dotted line position shown in FIGURE 2.

As best shown in FIGURE 8, guide 322 comprises a one piece metal member having an arcuate deflector surface 324 facing and being coextensive with rollers 222 to delimit throat 321. The radius of curvature of surface 324 has a center which is nearly coincident with the center of rollers 222. At its lower end, surface 324 merges with a straight substantially horizontally extending lip 326 which is vertically below and spaced from rollers 222 and which initially engages the document to guide it smoothly into throat 321. Deflecting surface 324 extends with a substantially uniform radius of curvature over an arc that is somewhat less than 180° and terminates at its upper end forwardly of rollers 222.

With continued reference to FIGURES 6 and 8, guide 322 is formed with a document feed shelf portion 328 having a flat horizontal top surface 330 extending forwardly from the upper end of deflecting surface 324 to define a rearwardly facing edge 331. Feed shelf portion 328, as best shown in FIGURES 2 and 6, extends through slot 30 in front panel 32 of casing 22.

With reference now to FIGURES 4, 7, and 8, guide 322 is formed with a flat sided horizontally extending transverse groove 332 which is formed with a flat bottom surface 335 and which opens forwardly in a direction facing away from panel 32. A flat sided support bar 334 slidably extends through groove 332 and projects at both ends therebeyond. Screws 336 (FIGURES 4 and 7) extending through the projecting ends of bar 334 are threaded into tapped bores formed in frame 23 to removably fix bar 334 to frame 23.

Owing to unavoidable manufacturing tolerances, the dimensions of the various document engaging parts, such as the feed and pick-up roller diameters, will vary over a small predetermined range. These variations in the dimensions of the paper engaging parts constitute a major factor causing the traveling document to turn or become skewed as it is moved through the printer. The skew imparted to the traveling document is objectionable, as previously mentioned, since the print on the copy paper will also be skewed by a corresponding angle. Moreover, the angle of skew can become progressively larger each time the document is recycled, and may be so large as to cause the document to jam in the printer, thus interfering with production.

To straighten out the traveling document, guide 322, according to this invention, is pivotally mounted on bar 334 as by a screw 337 which extends upwardly through a smooth walled bore 338 formed in guide 322 about midway between the ends thereof. The end of screw 336 projects into groove 332 and is threadedly received in a tapped bore 340 formed in bar 334 and axially aligning with bore 338. Bar 334 is spaced sufficiently from the bottom surface 335 of groove 332 to permit limited swinging movement of guide 322 about the longitudinal axis of screw 337.

As shown in FIGURE 7, a set screw 344 for adjusting the position of guide 322 is threadedly received in a tapped bore extending horizontally through bar 334 along an axis which is perpendicular to and laterally offset from the longitudinal axis of screw 337. The end of screw 344 engages the bottom groove surface 335 of guide 322. By threading screw 344 inwardly, guide 322 is swung in a counterclockwise direction as viewed from FIGURE 7, against the bias of a spring 346.

Spring 346, as best shown in FIGURE 7, is seated in a recess 348 formed in bar 334 and reacts against the bottom of recess 348 to exert a resilient force urging guide 322 in a clockwise direction about the axis of screw 337 and into abutment with the end of screw 344 which serves as a stop. Thus, by threading screw 344 outwardly, spring 346 will pivot guide 322 in a clockwise direction about the axis of screw 337 as viewed from FIGURE 7. To pivot guide 322 in the opposite direction, screw 344 is threaded inwardly to swing guide 322 against the bias of spring 346. In this manner, it is clear that guide 322 is adjustably swingable about an axis that is perpendicular to and laterally offset from the rotational axis of rollers 222.

Depending upon the relationship of the tolerances of the paper engaging parts of the document guide and roller feed structure, the traveling document will either skew to the left or right of its line of travel. To straighten the document before it is recycled through imaging station 33, guide 322 is adjusted by pivoting it either in a clockwise or counterclockwise direction depending on the direction of skew with the result that throat 321 will become narrower at one side than at the other. The leading edge of the skewed document entering throat 321 will thus engage deflecting surface 324 which is now skewed with respect to rollers 222 to straighten out the document as it passes through throat 321. As a result, the document emerging from throat 321 and passing between rollers 220 and 222 will be straight, substantially eliminating the problems of jamming and skewed prints.

Guide 322 is easily removed from printer 20 by unthreading screws 336.

As best shown in FIGURE 9, a document feed shelf 354 for guiding a document into printer 20 is adjustably mounted on on a rigid metal support bracket 358. Shelf 354 extends horizontally forwardly from slot 30 and has its rearward marginal edge seated on surface 330 of shelf portion 328.

As shown in FIGURES 1 and 9, feed shelf 354 is formed with a flat plate portion 355 having a document support surface 356. Plate portion 355, as viewed from FIGURE 9, is bent upwardly along its left-hand marginal edge to provide an upstanding guide wall 357 which extends at right angles to support surface 356. In feeding a document to be copied into printer 20, the operator slides the document along support surface 356 with one side edge of the document bearing against guide wall 357 to align the document relative to the rotational axes of rollers 220 and 222. In this manner, feed shelf 354 serves as a square gauge or fence to permit the operator of printer 20 to properly align the document to be copied as he feeds it through slot 30.

Referring now to FIGURES 4, 9 and 10, bracket 358 is detachably supported from guide 322 forwardly of panel 32 by axially aligned posts 360 and 362 which are fixed to guide 322 and which extend from opposite sides of shelf portion 328. Ears 364 (FIGURES 9 and 10) and 366 (FIGURES 4 and 9) formed integral with bracket 358 extend along opposite sides of shelf portion 328 and respectively hook over posts 360 and 362. With this construction, bracket 358 and feed shelf 354 are detachable as a unit by tilting bracket 358 upwardly until ears 364 and 366 are raised clear of posts 360 and 362.

With reference now to FIGURES 9 and 11, bracket 358 is integrally formed with a flat sided, horizontal plate portion 370 extending forwardly from front panel 32 along the underside of feed shelf 354. A vertical mounting post 372 fixed to feed shelf 354 adjacent the left side edge thereof extends downwardly and slidably through a straight sided slot 374 in plate portion 370. A fastener 378 (FIGURE 11) seated in an annular groove formed in the lower end of post 372 maintains a washer 380 (FIGURE 11) in bearing engagement with the underside of feed shelf 354 to vertically retain shelf 354 in its seated position on plate portion 370, but permitting shelf 354 to be slid along the longitudinal axis of slot 374 in substantially parallel relation to the rotational axes of rollers 222. Post 372 abuts the opposed side edges of slot 374 to prevent feed shelf 354 from being bodily displaced perpendicularly of the longitudinal axis of slot 374.

As viewed from FIGURE 9, a further post 382 is fixed to feed shelf 354 adjacent the right side edge thereof and extends vertically downwardly and freely through another slot 384 formed in plate portion 370 of bracket 358. The axes of posts 372 and 382 are parallel and are contained in a common plane passing generally parallel to the rotational axis of rollers 222. The longitudinal axis of slot 384 axially aligns with that of slot 374 and is substantially at right angles to the axes of posts 372 and 382. The clearance between post 382 and the opposed side edges of slot 384 is made sufficiently large as to permit limited swinging movement of feed shelf 354 about the axis of post 372 for adjusting the alignment of feed shelf 354 in a manner to be described shortly in greater detail.

As shown in FIGURE 12, a annular retainer 386 is formed with an axial through bore 387 that slidably, coaxially receives the lower end of post 382. A screw 388 is threaded into a tapped bore 389 coaxially formed in post 382 and extending upwardly from the lower end thereof. The head of screw 388 seats a washer 390 against a downwardly facing, recessed annular shoulder 391 formed in retainer 386.

With continued reference to FIGURE 12, retainer 386 is formed with an enlarged end portion 392 and a reduced diametered hub portion 393 extending axially upwardly from end portion 392. End portion 392 provides an upwardly facing annular surface 394 on which a disk spring 395 is seated. Spring 395 reacts against end portion 392 to axially urge a washer 396 upwardly toward the underside of plate portion 370. As shown, washer 396 and spring 395 freely surround hub portion 393. Hub portion 393 slidably extends through slot 384 with a close fit and abuts the underside of feed shelf 354 to prevent rocking movement of shelf 354 about the axis of post 372. When retainer 386 is shifted upwardly by tightening screw 388, spring 395 is compressed to urge washer 396 into snug bearing engagement with the underside of plate portion 370. In this manner, feed shelf 354 is frictionally clamped against movement on bracket 358 in a direction extending parallel to the longitudinal axes of slots 374 and 384. As a result, it is clear that by tightening screw 388, feed shelf 354 is clamped in place on bracket 358.

As shown in FIGURE 13, the longitudinal axis of hub portion 393 is laterally offset from, but parallel to the longitudinal axis of bore 387, thereby providing an eccentric relationship between hub portion 393 and post 382. Thus, by loosening screw 388 and turning retainer 386 about the axis of post 382, feed shelf 354 will be rocked about the axis of post 372 through the engagement of hub portion 393 with the opposed side edges of slot 384. In this manner the angle at which guide wall 357 extends with respect to the rotational axes of rollers 220 and 222 may be manually adjusted. This adjustment permits feed shelf 354 to be re-aligned to a position where guide wall 357 is substantially at right angles to the rotational axes of rollers 220 and 222 after guide 322 is adjusted in the manner previously described.

Before adjusting the angular alignment of feed shelf 354 with respect to the rotational axes of rollers 220 and 222, it is preferable to slide feed shelf 354 longitudinally with respect to slots 374 and 384 to assure that the document to be fed through slot 30 is substantially centered between the ends of roller assemblies 218 and 219. With screw 388 still loosened, retainer 386 then may be turned to selected position. The frictional engagement of hub portion 393 with the edges of slot 384 holds feed shelf 354 in its adjusted position, thus permitting a document to be inserted into printer 20 for producing a print to check the angular adjustment of shelf 354 with respect to the longitudinal axes of rollers 220 and 222. If the resulting print on the copy paper is skewed, retainer 386 is turned in the proper direction to correct for the skew and the adjustment is rechecked.

When feed shelf 354 is properly aligned, screw 388 is tightened to clamp shelf 354 in its adjusted position on bracket 358. Preferably, shelf 354 is swung to a fixed position where guide wall portion 357 is contained in a plane extending at right angles to the rotational axis of rollers 220 and 222.

Feed shelf 354 thus provides the operator with a guide for uniformly feeding documents to be copied at a predetermined angle to rollers 220 and 222 to thereby keep the operator from accidentally skewing the documents at varying, haphazard angles as he feeds them through slot 30 in casing 22. By feeding documents to be copied into printer 20 at the same angle relative to the rotational axes of rollers 220 and 222, the angle at which each document is skewed by the degradation of the document guide structure will be constant and thus may accurately be corrected by adjusting guide 322. In practice, guide 322 is first adjusted to straighten the document when it becomes skewed as a result of the inherent degradation of the document guide and roller feed structure. After guide 322 is fixed in its properly adjusted position, feed shelf 354 is then oriented independently of the adjusted position of guide 322 so that guide wall portion 357 preferably extends at right angles to the rotational axes of rollers 220 and 222. Thus, the foregoing adjustments of feed shelf 354 and guide 322 minimize the skew imparted to a document to be copied as it is fed into the printer and recycled in the course of producing multiple copies.

Referring now to FIGURES 2 and 14, a main on-off switch 410 mounted on the front of casing 22 is manually actuated to its "on" position for initiating operation of printer 20 by completing circuits through motor 118, a pump motor 412, motors 414 and 416 for exhaust fans 50, and a pilot lamp 418. Motor 412 drives a pump 420 (FIGURE 2) which circulates liquid developer or toner solution in tank 44 as described in greater detail in said copending application Serial No. 249,248.

Energization of motors 414 and 416 to drive fans 50 effects a flow of air in casing 22 to remove heat produced by the operation of printer 20 and to assist in drying and developing the copy paper after it passes through tank 44 and between squeegee rollers 46 and 48. Energization of motor 118 sets chain 112 in motion to continuously drive rollers 124, 125, 142, 144, 162, 164, 46, 48, 174 and 176 and conveyors 150 and 49 for transporting the copy paper. In addition, chain 112 will also continuously drive rollers 220, 222, 236, 238, 262, 264, 290, 292, and 320 and conveyor 248 for transporting the original document to be copied. Rollers 60, 62, 65, and 100 for removing the sheets of copy paper from stack 25 in compartment 24 will be rotated only when clutch 108 is energized.

With continued reference to FIGURES 2 and 14, switch 410 is connected in series with a pair of interlock switches 422 and 424 mounted on frame 23. Switches 422 and 424 are opened when casing 22 is removed. This prevents operation of printer 20 unless casing 22 is mounted in place on frame 23. With casing 22 mounted in place on frame 23 in the manner shown in FIGURE 1, switches 422 and 424 are closed to permit the circuits to be completed for energizing motors 118, 412, 414 and 416 whenever switch 410 is closed.

Closing of switch 410 also completes a circuit through a normally open switch 426 and a normally closed switch 428 for energizing clutch 108. Clutch 108 is also energizable through a pair of series connected, normally closed switches 430 and 432.

As best shown in FIGURE 2, switches 426 and 430 are mounted on frame 23 and have actuators disposed in the path of the document advanced by rollers 220 and 222 along guide 239. The actuators of switches 426 and 430 are so positioned that switches 426 and 430 will be actuated by the advancing document at the same time. It will be noted that all of the switches shown in FIGURE 14 which are actuated by the traveling document or sheets of copy paper are tripped by the leading edge of the document or copy paper as the case may be and are held in their tripped positions until the trailing edge of the document or copy paper clears the switch actuators.

Switch 428 is also mounted on frame 23 and has an actuator extending into the document feed path 240 between the actuators for switches 426 and 430 and rollers 236 and 238. Switch 432 is mounted on frame 23 and has an actuator extending across the feed path of the copy paper at a point along throat 123 between the ends of guides 121 and 122.

With continued reference to FIGURES 2 and 14, flipper 310 is actuated by a solenoid 434 mounted on frame 23 and having an operating coil 436. One terminal of coil 436 is connected through a conductor 437 to one side of the power source 437a shown in FIGURE 14. The other terminal of coil 436 is connected to a switch blade 440 of a two-position switch 438. Switch blade 440 is engageable with either a contact 442 or a contact 444. Contact 444 is connected through a conductor 446 to switch 410. Contact 442 is separately connected through a flipper hold switch 448 to conductor 446. Switch 438, as shown in FIGURE 2, is mounted on frame 23 with switch blade 440 extending across the document guide path defined by the rear turn around guide 281. A normally open switch 450 has one terminal connected to conductor 446 and its other terminal connected to contact 444 and also to conductor 437 through a multiple copy dial lamp 452 which is in parallel with operating coil 436.

As best shown in FIGURE 2, solenoid 434 has a plunger 454 connected by a linkage 456 to shaft 318 of flipper 310. A coil spring 458 surrounding plunger 454 biases flipper 310 to its single copy full line position shown in FIGURE 2.

Referring now to FIGURES 15 and 16, switch 450 is actuated by a spring leaf 554 carrying a roller 556 that engages the periphery of a cam 558. Cam 558 is fixed on a rotatable shaft 559 of a selector dial drive comprising a stepper mechanism generally indicated at 562. Shaft 559 is mounted on frame 23 by suitable bearings (not shown) within casing 22. Stepper mechanism 562, as will be explained in detail later on, controls the rotation of shaft 559 and thus the actuation of switch 450 to provide for the production of a selected number of copies from a single original document.

The periphery of cam 558 is smooth and has a uniform radius except for a single longitudinal groove 560. When roller 556 is seated in groove 560 switch 450 is open as shown in FIGURE 14. When cam 558 is rotated so that roller 556 engages any other part of the cam periphery indicated at 563, switch 450 is closed.

With continued reference to FIGURE 14, stepper mechanism 562 is generally of conventional construction and comprises a pivotally mounted spring biased pawl 566 which is engageable with a ratchet wheel 568 fixed on shaft 559. Pawl 566 is attracted by energizing a stepper coil 572.

As shown in FIGURE 14, coil 572 is in parallel with coil 436. One terminal of coil 572 is connected to conductor 446 through a normally open switch 574, a normally closed switch 576, and a normally open switch 578. The other terminal of coil 572 is connected to conductor 437. As a result, switches 574, 576, and 578 in addition to switches 410, 422, and 424 all must be closed before coil 572 can be energized to attract pawl 566. As coil 572 is intermittently pulsed in a manner to be described shortly, pawl 566 engages ratchet wheel 568 to rotate shaft 559 and cam 558.

As best shown in FIGURE 16, shaft 559 is coaxially formed with a smooth, blind bore 579 which slidably receives a dial shaft 580. A member 580a fixed on shaft 580 non-rotatably mounts a selector dial 581 within casing 22. Shaft 580 projects forwardly beyond panel 32 and non-rotatably mounts a suitable knob 582 to permit an operator to manually set the dial drive mechanism for making a selected number of copies from an original document. For this purpose, dial 581 is provided with circumferentially spaced indicia which are displayed through a window 582a in panel 32.

With continued reference to FIGURE 16, a cylinrical pin 583 is received in a transverse through bore in shaft 580 and slidably projects at one end into a longitudinal, forwardly opening slot 584 formed in shaft 559 to non-rotatably lock shafts 559 and 580 together. By turning dial 581, shaft 559 is rotated to a position for conditioning printer 20 to automatically produce a selected number of copies as will be explained in greater detail later on. When it is desired to remove casing 22, shaft 580 is first axially withdrawn from bore 579. Dial 581 is slidably along member 580a which is removed with shaft 580. As shown, dial 581 is provided with a hub portion extending through the opening in panel 32 and having an annular recess 584a. When shaft 580 and member 580a are fully removed, dial 581 drops into a position wherein recess 584a receives a portion of panel 32, thereby supporting dial 581 on panel 32 when casing 22 is removed.

As best shown in FIGURE 15, switch 578 is provided with an actuator which is operated by leaf 554 simultaneously with the operation of switch 450. Switch 574 is mounted on frame 23 and, as shown in FIGURE 2, has an actuator extending into the document feed path 240. Switch 574 is tripped by a document advancing towards rollers 236 and 238 simultaneously with the actuation of switches 426 and 430.

To produce only one copy of an original document, dial 581 is turned to a single copy position where roller 556 seats in groove 560. In this position, switches 450 and 578 are opened to respectively interrupt the circuits for energizing solenoid 434 and coil 572. As a result, flipper 310 is biased into its full line, single copy position shown in FIGURE 2, and stepper mechanism 562 is inoperative to rotate cam 558 for actuating switches 450 and 578.

With motor 118 energized as a result of closing switch 410 and with dial 581 set to its single copy position, clutch 108 will be energized through switches 430 and 432. Rollers 60 and 62 engaging the top sheet of copy paper in stack 25 will be rotated in a counterclockwise direction as viewed from FIGURE 2 to feed the top sheet of copy paper through a slot in the rear end of compartment 24. The sheet of copy paper advanced by rollers 60 and 62 is fed between pick-up rollers 65 and 100 which advances the copy paper between guides 120 and 121 to trip switch 432 to its open position.

By opening switch 432 clutch 108 is immediately de-energized to interrupt the drive to rollers 60, 62, 65, and 100. By stopping rotation of rollers 65 and 100, the advancement of the sheet of copy is stopped at a ready position with its leading edge engaging the actuator of switch 432, thereby holding switch 432 open. It will be noted that the leading edge of the copy paper at this which are continuously rotated as long as motor 118 is energized.

With continued reference to FIGURES 2 and 14, the leading edge of the sheet of copy paper also engages an actuator of a normally open switch 586 simultaneously with the engagement of the actuator of switch 432. Switch 586 is closed by the advancement of the copy paper to its ready position to complete a circuit for energizing a feed lamp 588 through a pair of normally closed switches 590 and 592. Switches 586, 590 and 592 are connected in series with feed lamp 588 across conductors 437 and 446. Thus, when a sheet of copy paper is advanced to its ready position, feed lamp 588 will be illuminated provided that switches 590 are closed.

Switch 590 is mounted in frame 23 and, as shown in FIGURE 2, has an actuator extending into the document feed path 240. By advancing a document to be copied into printer 20, switch 590 is opened simultaneously with the actuation of switches 426, 430, and 574. Switch 592 is held closed by leaf 593 and cam 595 when roller 556 is seated in groove 560 of cam 558. Switch 592 remains latched in its closed position even though dial 581 is turned to some multiple copy position by latch 597. When stepper solenoid 572 is energized it raises latch 597 and switch 592 opens and remains open until cam 558 is rotated to its single copy position where cam 595 engages leaf 593 to close switch 592.

Considering the operation of printer 20 for producing a single copy of an original document, cam 558, as previously mentioned, is turned to its single copy position where roller 556 seats in groove 560 to open switches 450 and 578 and to close and latch switch 592. When switch 410 is closed, energizing motor 118, clutch 108 is energized through switches 430 and 432 to transmit power for driving rollers 60, 62, 65, and 100. By rotating rollers 60 and 62, the top sheet of copy paper in stack 25 is advanced between rollers 65 and 100 which feed the copy paper through throat 123 to its ready position where its leading edge engages the actuators of switches 432 and 586 to open switch 432 and close switch 586. Opening of switch 432 de-energized clutch 108 to stop the advancement of the copy paper short of rollers 124 and 125 which are continuously rotating as previously explained. Closing of switch 586 completes a circuit through switches 590 and 592 to energize feed lamp 588, signalling the operator to manually feed in the original document to be copied into the printer.

The original document inserted through slot 30 is advanced along guide path 240 by rollers 220 and 222 which are rotating continuously. The leading edge of the document after passing between rollers 220 and 222 simultaneously engages the actuators of switches 426, 430, 574, and 590 to close switches 426 and 574 and to open switches 430 and 590. Opening of switch 590 interrupts the circuit for feed lamp 588 to signal the operator of the printer. Closing of switch 574 will not complete a circuit for energizing stepper coil 572 since switch 578 is held open by cam 558.

By closing switch 426, another circuit through switch 428 is momentarily completed to re-energize clutch 108. As a result, a drive connection is established at the moment the leading edge of the original document actuates switch 426 to again rotate rollers 65 and 100 and advance the sheet of copy paper which had been previously advanced to its ready position in throat 123. This control of the operation of clutch 108 by the advancement of the original document towards imaging station 33 thus establishes a timed relationship between the movement of the copy paper and the document to be copied to assure that the copy paper and the document pass through their respective imaging stations 28 and 33 at the same time.

After switch 426 is closed by advancement of the document to be copied, clutch 108 remains energized by the circuit traced through switches 426 and 428 until the leading edge of the document has advanced sufficiently far along guide 239 to trip switch 428 to its open position. Opening of switch 428 interrupts the energizing circuit for clutch 108, and since switch 432 is held open by the sheet of copy paper advancing from its ready position, clutch 108 will remain de-energized until the trailing edge of the copy paper clears the actuator of switch 432 and the trailing edge of the original document clears the actuator of switch 430. Thus, clutch 108 remains re-energized to advance the sheet of copy paper from its ready position in throat 123 for the period of time that the leading edge of the document to be copied moves from the actuator of switch 426 to the actuator of switch 428.

The distance along the copy paper guide path between the actuator of switch 432 and rollers 124 and 125 is somewhat less than the distance along the document guide path between the actuators of switches 426 and 428. Since the copy paper and the document to be copied are both advanced by motor 118 at essentially the same speed, then the sheet of copy paper will be advanced sufficiently far to be picked up by rollers 124 and 125 when clutch 108 is momentarily energized through the circuit completed by closing switches 426 and 428. As previously explained, rollers 124 and 125 are continuously rotated as long as motor 118 is energized to feed the copy paper toward corona unit 27.

At the same time that the leading edge of the document to be copied engages the actuators of switches 426, 430, 574, and 590, it also engages an actuator of a normally open switch 596 which, as shown in FIGURE 14, is connected in series with a primary winding 598 of a high voltage transformer 600. Transformer 600 is provided with a secondary winding 602 which is preferably connected to corona unit 27 in the manner described in detail in said copending application Serial No. 249,248. When the actuator of switch 596 is tripped by the advancing document, switch 596 closes to complete a circuit through winding 598 to energize corona unit 27 at the same time that clutch 108 is re-energized to start the advancement of the first sheet of copy paper from the ready position in throat 123 towards rollers 124 and 125. Rollers 124 and 125 feed the copy paper through corona unit 27 which now has been activated to apply a uniform charge to the copy paper surface as previously described. Rollers 142 and 144, which are also continuously rotated when motor 118 is energized, pick up the charged copy paper emerging from corona unit 27 and advance the copy paper towards imaging station 28.

Referring to FIGURES 2 and 14, the leading edge of the advancing document to be copied trips an actuator to close a further normally open switch 604 at the same time that it trips switch 596. Actuation of switch 604 to its closed position closes a circuit to another normally open switch 606 which is tripped to its closed position by the leading edge of the advancing document at the same time that switch 428 is opened. Switches 428 and 606 are tripped by the advancing document considerably before the trailing edge of the document clears the actuators of switches 426, 430, 574, 590, 596, and 604 with the result that switches 426, 430, 574, 590, 596, and 604 are held in their tripped positions when the document trips switches 428 and 606.

By closing switches 604 and 606 a circuit is completed to energize a winding 608 of a relay 610 in an energizing network for projection lamps 36 and 37. Energization of relay 610 closes two sets of normally open relay contacts 612 and 614 and opens switch 576. Contacts 612 and 614 are respectively connected in series with projection lamps 36 and 37 across conductors 446 and 437. As a result, lamps 36 and 37 are illuminated by advancement of the document to be copied to the position along guide path 240 where it trips switch 606 after tripping switch 604.

The function of switch 576 will be explained later on in connection with the production of multiple copies.

The document to be copied is advanced by rollers 220 and 222 to rollers 236 and 238 which feed the document through imaging station 33. At the same time, the sheet of copy paper advanced through corona unit 27 is picked up by rollers 142 and 144 which feed the copy paper through imaging station 28. The copy paper and the document to be copied are advanced through their respective imaging stations at the same speed.

As the original document passes through its imaging station 33, it is struck by the light emitted from projection lamps 36 and 37, and the image of the document is reflected by mirror 38 into the image projector 29 through lens 40. The image passing through imaging projector 29, emerges through a glass plate 618 (FIGURE 2) and strikes the negatively charged surface of the copy paper passing through imaging station 28. The uniform negative charge on the copy paper is reduced in proportion to the intensity of the light striking the copy paper. Since little light will be reflected from the black areas of the original, the charge on areas of the copy paper against which the light reflected from such areas, strikes will be reduced very slightly. On the other hand, the charge on areas of the copy paper struck by the light reflected from white areas of the original, such as the white background of a letter, will almost be entirely dissipated since the most intensive light will be reflected from those areas. As the original and the copy paper continue through their respective imaging stations, the image on the original is reproduced in latent form on the copy paper through dissipation of the charge on its surface in the manner described above.

As the copy paper emerges from imaging station 28 as shown in FIGURE 2, it simultaneously trips two normally open switches 620 and 622 before entering tank 44. By closing switch 620, a further circuit, as shown in FIGURE 14, is provided in parallel with the circuit through switches 604 and 606 for maintaining relay 610 energized. Shortly after switcth 620 is tripped, the trailing edge of the original document clears the actuators of switches 426, 430, 574, 590, 596, and 604 where the original document and the sheet of copy paper are about the same length. As a result, switches 426, 574, 596, and 604 will open, and switches 430 and 590 will close. Although switch 604 opens at this time, projection lamps 36 and 37 remain illuminated as a result of the relay energizing circuit completed by closing switch 620.

If the sheet of copy paper and the document are the same length, the trailing edge of the copy paper will clear the actuators of switches 432 and 586 at the same time that the trailing edge of the document clears the actuators of switches 426, 430, 574, 590, 596, and 604 with the result that switches 432 and 586 will respectively open and close at the same time that switches 426, 574, 596, and 604 open. Closing of switches 430 and 432 again completes a circuit for energizing clutch 108 to drive rollers 60 and 62 for advancing the next sheet of copy paper in stack 25 to rollers 65 and 100. Rollers 65 and 100, as previously described, advances the new sheet of unprocessed copy paper through throat 123 to the ready position where the leading edge of the copy paper trips switch 432 to de-energize clutch 108. With dial 581 set at its single copy position, an original document must again be inserted manually into the printer to cause further advancement of this sheet of unprocessed copy paper from its ready position.

After the trailing edge of the original document clears the actuator of switch 596, corona unit 27 remains energized through switch 622 and a normally open switch 624. Switch 624 is connected in series with switch 622 and winding 598 and has an actuator which is positioned in document feed path 240 to be tripped to its closed position simultaneously with the actuation of switches 428 and 606. Corona unit 27 will remain energized as a result of the closing of switch 622 by the copy paper and the closing of switch 624 by the original document.

When the trailing edge of the original document clears the actuators for switches 428, 606, and 624, switch 624 will open to de-energize corona unit 27. Although switch 606 opens at this stage of the operation, relay 610 and, consequently, projection lamps 36 and 37 remain energized through switch 620.

As the copy paper which was advanced through corona unit 27 and imaging station 28 passes through tank 44, its trailing edge clears the actuator for switch 620, permitting this switch to open with the result that projection lamps 36 and 37 will turn off. The processed copy paper is advanced from tank 44 to surface 52 where it may be removed from the printer as previously explained. The original document, in the meantime, is advanced through the rear turn-around guide 281. As the document emerges from guide 281, it is picked up by rollers 290 and 292 and fed toward front panel 32. With flipper 310 in its raised, full line position shown in FIGURE 2, the document advanced by rollers 290 and 292 is guided under flipper 310 and is deposited in tray 312 for removal by the operator.

To automatically make more than one copy of an original document, dial 581 is manually set to the number of copies desired. This revolves ratchet wheel 568 by a number of notches corresponding to the number of copies to which dial 581 is set. By turning dial 581 away from its single copy position, cam 558 is also rotated to displace roller 556 from groove 560, causing it to engage periphery 563. As a result switches 450 and 578 will close.

By closing switch 450, solenoid 434 is energized to swing flipper 310 downwardly to its document recycling position shown in dot-dash lines in FIGURE 2. Also, switch 448 is closed by energizing solenoid 434 for a purpose to be explained shortly. By closing switch 578, a circuit for energizing stepper coil 572 will be established when switch 574 is closed, provided that switch 576 is also closed.

When switch 410 is now closed, motors 118, 412, 414, and 416 and clutch 108 are energized in the manner previously explained. As a result, the top sheet of copy paper is advanced from stack 25 to its ready position in throat 123 where the leading edge of the sheet trips switches 432 and 586 to de-energizes clutch 108 and energizes feed lamp 588 as previously described. The operator now feeds the document to be copied through slot 30 where it is picked by the rollers 220 and 222 and advanced along guide path 240. As the document is fed towards imaging station 33, the leading edge of the document will trip switch 574 to its closed position simultaneously with the actuation of switches 426, 430, 590, 596 and 604 as previously described. By closing switch 574 a circuit is completed through switch 576 and 578 to energize stepper coil 572. Switch 576 will be closed since, at this stage of the operation, relay 610 is de-energized.

Advancement of the document to be copied a short distance along guide path 240 trips switch 606 to its closed position in addition to actuating of switches 428 and 624. By closing switch 606, as previously explained, a circuit is completed through switch 604, which is being held closed by the document in guide path 240, to energize relay 610, thereby opening switch 576 to interrupt the energizing circuit for stepper coil 572. Thus by the closing of switch 574 followed shortly by the opening of switch 576, stepper coil 572 is pulsed to momentarily attract pawl 566, causing it to revolve ratchet wheel 568 by one notch towards the notch that corresponds to the single copy position where roller 556 seats in groove 560.

Assuming that dial 581 was originally set to make three copies of the original document, the first pulse of stepper coil 572 resulting from the sequential actuation of switches 574 and 576 moves cam 558 to a position where groove 560 is removed from roller 556 by a distance corresponding to two notches on ratchet wheel 568. As a result, switches 450 and 578 are still held in their closed positions.

The first pulse of stepper solenoid 572 unlatches the actuating leaf of switch 592, permitting switch 592 to open with the result that the energizing circuit for feed lamp 588 is interrupted. Lamp 588 will not be illuminated again until cam 558 is rotated to its single copy position where roller 556 seats in groove 560 to close and relatch switch 592 and until another sheet of copy paper is fed from compartment 24 to close switch 586.

As the original document is advanced along guide path 240, clutch 108 is re-energized momentarily in the manner previously explained to start the advancement of the copy paper at the ready position in throat 123. In addition, projection lamps 36 and 37 and corona unit 27 are energized in the manner described in the operation of printer 20 for making a single copy. The original document and the first sheet of copy paper then pass through their respective imaging stations 28 and 33, and the image of the original is printed on the copy paper which then is conveyed through tank 44 to tray surface 52.

As the original document clears the actuator of switch 430 and the first sheet of copy paper clears the actuator of switch 432, switches 430 and 432 close to re-energize clutch 108 to revolve rollers 60, 62, 65, and 100 for advancing the next sheet of copy paper in stack 25 to the ready position in throat 123 in the same manner as previously described. The original document advancing through imaging station 33 is fed through the rear turn around guide 281 where its leading edge trips switch 438 to shift switch blade 440 into engagement with contact 442. The solenoid energizing circuit for holding flipper 310 in its downwardly swung, recycling position is now established through switch 448. This flipper solenoid energizing circuit arrangement assures continuity of power to keep flipper solenoid 434 energized as the document passes over flipper 310 even if dial 581 is set back at this time to its single copy position.

As a result of retaining flipper 310 in its recycling position, the document emerging from the rear turn around guide 281 is routed through path 308 and into throat 321 where the front turn around guide 322 deflects the document, as previously described, into the nip between rollers 220 and 222. Rollers 220 and 222 recycle the document through guide path 240 where switches 426, 430, 574, 590, 596, and 604 are first tripped, followed by the actuation of switches 428, 430, 606, and 624 in the same manner as hereinbefore described.

The sequential actuation of switches 574 and 576 again pulses stepper coil 572 to rotate cam 558 by a distance corresponding to one notch on ratchet wheel 568. In this position roller 556 still engages periphery 561 and is removed from groove 560 by a distance now corresponding to only one notch on ratchet wheel 568 with the result that switches 450 and 578 are still held in their closed positions.

Recycled advancement of the original document along path 240 and through station 33 operates clutch 108 to advance the second sheet of copy through corona unit 27 and imaging station 28 with the result that a second copy is produced. Also, the third sheet of copy paper in stack 25 is withdrawn from compartment 24 and advanced to its ready position in throat 123. Operation of the various control switches resulting from the recycling of the original document and the advancement of the second sheet of copy paper is the same as previously explained.

Since flipper 310 is still held in its downwardly swung, recycling position, the original document, which at this stage, has passed through imaging station twice will again be routed through path 308 and into throat 321 where guide 322 deflects it into rollers 220 and 222.

As the document is now advanced for the third time along guide path 240, it will cause the sequential actuation of switches 574 and 576 to pulse stepper coil 572 for the third time. The third pulse of coil 572 now returns cam 558 to its single copy position where roller 556 seats in groove 560. As a result, switches 450 and 578 will open to interrupt the energizing circuits for stepper coil 572 and for flipper solenoid 434. Flipper 310 is then released to swing upwardly to its single copy position.

The document and the third sheet of copy paper will now pass through their respective imaging stations 33 and 28 to produce the third and final print. When the document now emerges from the rear turn around guide 281, flipper 310 being in its upwardly swung, single copy position, routes the document into ejection path 306, depositing the document on tray 312 for removal by the operator. Actuation of switch 448 by the document as it is recycled in making the third print will not be effective to energize flipper solenoid 434 since switch 448 was opened as a result of de-energizing solenoid 434 when the document was advanced for the third time along guide path 240.

Referring now to FIGURES 6, 17, and 18, guide structure 311 now to be described, is a removable unitary assembly comprising a flat sided base plate 630 forming tray 312 and having a generally horizontal document support portion 632 bent upwardly along its marginal side edges to provide upstanding, parallel guide walls 634 and 636. The rearward ends of guide walls 634 and 636 are notched at 638 (FIGURES 6 and 17) and detachably hooked over a transverse rod 640 suitably fixed to frame 23 forwardly of flipper 310. The fit between the notched ends of guide walls 634 and 636 and rod 640 is such as to permit base plate 630 to be freely slidable along rod 640.

As best shown in FIGURE 19, a pair of latch springs 642 and 644 are disposed on opposite sides of base plate 630 adjacent the forward end of guide structure 311. Each of the springs 642 and 644 comprises a U-shaped upwardly opening spring leaf. Spring 642 has one end suitably fixed to panel 223 and a free end biased towards guide wall 634. Similarly, spring 644 has one end fixed to panel 223a and a free end biased towards guide wall 636. The free ends of springs 642 and 644 respectively terminate in noses 646 and 648 which are adapted to fit into mating outwardly opening indents 650 formed in guide walls 634 and 636 adjacent the forward ends thereof. Thus, it is clear that guide structure 311 is supported at its rearward end on rod 640 and at its forward end by springs 642 and 644.

With this construction, guide structure 311 is releasably latched in place by springs 642 and 644 and is removable from the printer simply by pushing down on the foward end of base plate 630 to force the spring noses 646 and 648 out of indents 650 to release base plate 630 from engagement with springs 642 and 644. Guide structure 311 then may be raised slightly and pulled forwardly to unhook plate 630 from rod 640 so that the guide structure then is free to be withdrawn through a front panel opening 651 (FIGURE 1) in printer 20. To mount guide structure 311 in place in printer 20, base plate 630 is first hooked over rod 640 with its forward end tilted downwardly below springs 642 and 644. The forward end of plate 630 is then swung upwardly forcing the free ends of springs 642 and 644 back toward panels 223 and 223a respectively until noses 642 and 644 snap into indents 650, thus latching guide structure 311 in place.

With continued reference to FIGURES 18 and 19, a pair of thin, flat sided, rigid plate members 652 and 654 seated on the upper surface of support portion 632 are fixed in any suitable manner to base plate 630. Plate members 652 and 654 each are bent upwardly along their marginal side edges to provide longitudinal document guide fingers 656 having identical configurations.

As shown in FIGURES 18 and 19, fingers 656 are uniformly spaced apart between guide walls 634 and 636 and extend parallel to the direction of travel of the document routed through path 306. Fingers 656, as shown in FIGURES 4 and 20, are formed with upwardly curved ends 658 projecting rearwardly beyond base plate 630 and terminating adjacent to flipper 310.

When flipper 310 is swung to its full line, single copy position, the document emerging from guide 281 is routed into path 306 and is supported as it travels forwardly only on the upwardly facing edges of fingers 656. With this construction, the area of guide structure 311 engaging the document is minimized with the result that no objectionable electrostatic charges of any consequence can accumulate to attract the document, causing it to stick or turn so that it can become jammed in the printer.

As best shown in FIGURES 17, 18, and 20, feed shelf 319 of guide structure 311 comprises a series of uniformly spaced apart fingers 660 having identical configurations and extending parallel to the direction of travel of the original document for guiding the document routed through recycling path 308. Fingers 660 each comprise thin, flat sided, metal plates so spaced above and in parallel with fingers 656 that the upwardly facing edges of fingers 656 delimit the lower boundary of ejection path 306 and the downwardly facing edges of fingers 660 delimit the upper boundary of path 306.

As shown in FIGURES 4, 17, and 20, the rearward ends of fingers 660 are formed with rearwardly opening slots 662 through which a support rod 664 extends in parallel relationship to rod 640. Rod 664 is fixed at opposite ends to ears 666 and 668 formed integral with guide walls 634 and 636 respectively. Rod 664, as best shown in FIGURE 18, extends between walls 634 and 636 and is formed with expansion bends adjacent both of its ends to provide sufficient flexure to keep it from buckling or bending as a result of the large temperature variations that may occur in printer 20.

With continued reference to FIGURES 6 and 17–20, fingers 660 are suitably fixed to rod 664 and extend forwardly beyond the front edge of base plate 630. A straight support rod 670 (FIGURE 18) fixed at opposite ends to upstanding ears formed integral with guide walls 634 and 636 adjacent the forward end of base plate 630 extends through elongated slots 672 (FIGURE 20) formed in fingers 660. Fingers 660 are fixed to rod 670 by any suitable means. The forward ends of fingers 660 extending beyond base plate 630 are formed with forwardly opening slots 674 through which a narrow, thin, flat sided support plate 676 extends. Support plate 676 is fixed to fingers 660 and has rearwardly opening slots receiving fingers 660 in internested relationship. Support plate 676 keeps the forward ends of fingers 660 sufficiently rigid to prevent undesirable deformation of the fingers owing to temperature variations in printer 20.

With continued reference to FIGURES 17, 18, and 20, fingers 660 are formed with aligned elongated slots 679 between rods 664 and 670. A straight support rod 681 extending through slots 679 is suitably fixed to fingers 660 to maintain fingers 660 in parallel relationship.

From the foregoing description it will be appreciated that guide structure 311 is free to expand laterally, urging the free ends of springs 642 and 644 towards panels 223 and 223a respectively. In addition, the support provided by rod 640 and springs 642 and 644 also permit guide structure 311 to expand longitudinally. Thus, when the temperature in casing 22 is increased owing to operation of printer 20, guide structure 311 will not buckle or deform. Deformation of guide structure 311 owing to temperature variations is objectionable since it would cause the document to become skewed or to jam in the printer. With this invention, however, the paper engaging surfaces of structure 311 remain undeformed as a result of temperature variations to thus maintain proper alignment of the document as it is routed through path 306 or path 308.

By supporting fingers 660 from base plate 630 solely by rods 664 and 670 and by elongating slots 662 and 672, limited expansion of fingers 660 relative to base plate 630 is permitted without causing fingers 660 to buckle or deform. As a consequence of this support construction for fingers 660 and of the support construction for base plate 630 as previously described, fingers 660 are maintained straight, parallel, and in alignment with the direction of travel of the document even if the temperature within printer 20 increases considerably.

It will also be appreciated that by releasably latching guide structure 311 in place with springs 642 and 644, structure 311 is simply and easily removed from the printer without the need of tools or of removing any other parts. By making guide structure 311 easily removable in this manner, ready access to documents jammed in structure 311 or in turn around guides 281 or 322 is facilitated. This is especially advantageous with the printer described herein since documents that are smaller than a predetermined size, or are very bulky, or are very thin, or are wet or sticky, or have staples or paper clips, tend to jam in the printer especially along regions of the feed back path extending from turn around guide 281 to turn around guide 322.

With continuing reference now to FIGURES 18–20, dog ears on an original document routed along paths 308 are lifted and straightened by flat-sided, thin metal plates 680 extending between adjacent fingers 660 and suitably fixed near opposite ends to rod 670 and plate 676. Plates 680, as best shown in FIGURE 20, extend below the upwardly facing edges of fingers 660. Each of the plates 680 is formed with an intermediate concave section 682 joining substantially straight end sections 684 and 686.

During operation of printer 20, any dog ears on the leading or trailing corners of the documents ride over plates 680, engaging the upwardly facing surfaces defined by sections 682, 684, and 686. If the document is turned down at one or both of its trailing corners, the dog ear first engages section 684 which lifts it partially and then rides down into the recess formed by section 682. As the document continues to move along path 308, the dog ear engages and is lifted up by section 686.

If the document is turned down at one or both of its leading corners, the dog ear rides over section 684 and as it passes into the recess formed by section 682, it is straightened and then lifted up as it rides over section 686. Thus, plates 680 are effective to lift and thereby straighten dog ears so that the document is flat when fed into rollers 220 and 222.

With continued reference to FIGURES 17–20, fingers 660 are formed with arcuate aligned recesses 688 through which roller 320 axially extends. Each of the fingers 660, as best shown in FIGURES 6, 17 and 18, are gradually upwardly sloped approaching roller 320 and gradually downwardly sloped on the exit side of roller 320 to provide a smooth guide surface for routing the document passing between rollers 320 and 238.

Referring now to FIGURE 21, a mechanism 700 for automatically replenishing the toner pigment applied to the copy paper in tank 44 is shown to comprise a container 702 in which a liquid pigment particle solution is stored. Container 702 is suitably mounted on frame 23 and is formed with a cylindrical section 704 providing a liquid outlet port 706 for supplying the stored solution to tank 44.

With continued reference to FIGURE 21, a valve member 708 is mounted in cylindrical section 704 for controlling flow of the solution through outlet port 706.

Valve member comprises a cylindrical section 710 axially extending between radial flange portions 712 and 714 which respectively define opposed annular seating surfaces 716 and 718. Surfaces 716 and 718 are respectively adapted to seat against oppositely facing annular surfaces 720 and 722 formed in cylindrical section 704 at opposite ends of a straight through bore 724 which coaxially receives section 710 of valve member 708 and which establishes fluid communication between the interior of container 702 and outlet port 706.

Valve member 708, as shown in FIGURE 21, is biased by a spring 726 to a position where surface 716 seats on surface 720 to block passage of the solution in container 702 through bore 724. The dimensions of bore 724 and valve member 708 are such that when surface 716 seats on surface 720, surface 718 is axially spaced below seating surface 722. When valve member 708 is lifted from the position shown in FIGURE 21 against the bias of spring 726, the solution in container 702 will flow through bore 724 along longitudinal grooves 728 formed in section 710 until valve member 708 is raised to a position where surface 718 seats against surface 722. Thus in either its fully raised or fully lowered position, valve member 708 serves to block supply of solution to tank 44. As valve member 708 is raised from its position shown in FIGURE 21 to its fully raised position, a metered predetermined amount of solution in container 702 is permitted to flow into tank 44 to replenish the tank solution with pigment.

To automatically operate valve member 708, an actuating arm 730, as shown in FIGURE 21, is pivotally mounted on frame 723 by a pin 731 and has one end adapted to engage the lower end of member 708. By pivoting arm 730 in a clockwise direction as viewed from FIGURE 21, valve member 730 is lifted against the bias of spring 726. To pivot arm 730 for lifting valve member 708, a solenoid 732 (FIGURES 21 and 14) is suitably mounted on frame 23 and has one terminal connected to conductor 437.

As shown in FIGURE 14, the other terminal of solenoid 732 is connected by a conductor 733 to a contact 734 of a two position manually operated, spring loaded pushbutton switch 736 and also to a switch blade 738 of a normally open switch 740. Switch blade 738 is adapted to engage a contact 742 which is connected by a conductor 744 to a further contact 746 of switch 736.

To manually operate the valve member 708 and with continued reference to FIGURE 14, switch 736 has a leaf 748 normally engaging contact 746 to establish a circuit for energizing solenoid 732 when switch 740 is closed. A pushbutton 735 suitably mounted on the switch 736 is depressible to actuate leaf 748 to engage contact 734 to thus complete a circuit for selectively energizing solenoid 732 through conductor 733. Energization of solenoid 732 attracts arm 730, causing it to pivot in a clockwise direction as viewed from FIGURE 21 for lifting valve member 708 against the bias of spring 726.

With reference to FIGURES 14, 21, and 22, switch 740 is actuated by a mechanism comprising a cam 754 non-rotatably mounted on a drive shaft 752 of a conventional timer motor 756. One motor winding terminal of motor 756 is, as shown in FIGURE 14, connected to conductor 437. The other terminal of motor 756 is connected to a blade 758 of a two-position switch 760 having contacts 762 and 764.

Blade 758 normally engages contact 762 which is connected by a conductor 766 to a conductor 446 to energize motor 756 when switches 410, 422, and 424 are closed through a current path that is in parallel with solenoid 732.

With continued reference to FIGURE 14, contact 764 is connected to conductor 446 through switches 604 and 606 and also through switch 620. Thus, when switch blade 758 engages contact 764, motor 756 is energized to rotate cam 754 whenever relay 610 is energized to illuminate lamps 36 and 37.

As shown in FIGURE 21, switch 760 is actuated by a spring leaf 768. A roller 770 mounted on leaf 768 is biased into engagement with the periphery of cam 754 which is formed with three circumferentially spaced apart notches 771, 772, and 774. When roller 770 is unseated from cam notches 771, 772, or 774 and rides high on the periphery of cam 754 switch blade 758 is urged into engagement with contact 764 to complete a circuit for energizing motor 756 whenever relay 610 is energized. When cam 754 is rotated to a position where roller 770 seats in any one of the notches 771, 772, or 774, switch blade 758 is moved into engagement with contact 762 to keep motor 756 energized through conductor 776. As a result, motor 756 cannot be de-energized when roller 770 is in any of the notches 771, 772, and 774 for a purpose to be explained shortly.

With continued reference to FIGURE 21, switch 740 is actuated by leaf 768 and is closed to complete a circuit for energizing solenoid 732 whenever roller 770 seats in any of the cam notches 771, 772, and 774. Actuation of switch 740 is so adjusted that it closes after switch blade 758 engages contact 764 and opens before blade 758 disengages from contact 764. This insures that solenoid 732 is not held energized for objectionable, long periods of time. Owing to the previously described circuitry for energizing motor 756, it will be appreciated that cam 754 cannot be stopped in a position where roller 770 is seated in any one of the notches 771, 772, or 774 with the result that solenoid 732 cannot be continuously energized to permit an excessive amount of pigment to be supplied to tank 44.

As shown in FIGURE 21, switches 760 and 740 are suitably mounted on a support plate 776 which is secured in place on frame 23. Motor 756 is mounted on plate 776 by any suitable means.

In operation of the automatic pigment replenishing system just described, switches 410, 422, and 424 are first closed and the copy paper and the document to be copied are fed through printer 20 as previously described. When switches 604 and 606 are closed by the advancing document, relay 610 is energized to illuminate exposure lamps 36 and 37. Closing of switches 604 and 606 also completes a circuit for energizing motor 756 through switch 760 with the result that cam 754 will be rotated. When roller 770 enters any one of the cam notches 771, 772, or 774, switch 740 closes to energize solenoid 732 through switch 736. Since an energizing circuit for motor 756 is maintained through engagement of switch blade 758 with contact 762 when roller 770 is seated in any of the cam notches 771, 772, or 774, cam 754 will continue to rotate, causing roller 770 to ride out of the cam notch to open switch 740. As a result, solenoid 732 will be pulsed each time roller 770 rides into one of the cam notches 771, 772, or 774.

By pulsing solenoid 732, arm 730 is momentarily attracted to lift valve member 708. When solenoid 732 is deenergized, spring 726 returns valve member 708 to its position shown in FIGURE 21. As a result of displacing valve member 708 in this manner, a small predetermined amount of solution in container 702 is supplied to tank 44.

Motor 756, it will be noted, remains energized to continuously rotate cam 754 until the trailing edge of the document clears the actuator for switch 604 and the trailing edge of the copy paper clears the actuator for switch 620. Since switch 606 is closed at the time the copy paper is picked up by rollers 124 and 125, cam 754 will be continuously rotated for the period of time that the leading edge of the copy paper travels from rollers 124 and 125 to the actuator of switch 620. Thereafter, cam 754 continues to be rotated depending essentially upon the length of the copy paper since the leading edge of the copy paper trips switch 620 to closed position and holds switch 620 in closed position until its trailing edge clears the actuator for switch 620. Thus, the amount of pigment supplied to tank 44 is made dependent on the length of copy. The length of copy paper, it will be appreciated, constitutes an approximate measure of the amount of pigment picked up by the copy paper in tank 44 and thus the amount of pigment that is required to be replaced.

The number of shots of solution supplied to tank 44 from container 702 may be adjusted by varying the speed of motor 756 or by changing the number of notches in cam 754. If an additional amount of pigment is needed to replace that which is removed by the copy paper, pushbutton 736 is manually depressed to swing leaf 748 into engagement with contact 734 for energizing solenoid 732 through conductor 733. When pushbutton 736 is released, this energizing circuit for solenoid 732 is interrupted by the return movement of leaf 748 into engagement with contact 746 where solenoid 732 is energized only when switch 740 is closed.

To effectively vary the number of notches in cam 754 in which roller 770 will seat, a plate 780, as shown in FIGURES 21 and 22, is mounted on the forward side of cam 754 by a pair of screws 782 and 784. Screws 782 and 784 extend through an arcuate slot 786 in plate 780 and are threadedly received in tapped bores (not shown) formed in cam 754. By loosening screws 782 and 784, plate 780 is adjustably swingable about the rotational axis of cam 754.

With continued reference to FIGURES 21 and 22, plate 780 is formed with an outer peripheral surface 788 which is flush with the periphery of cam 754 and which has an elongated, circumferentially extending, outwardly opening recess 790. In the position of plate 780 shown in FIGURE 21, recess 790 aligns with notch 772. The dimensions of plate 780 and of cam 754 are such that recess 790 will be disposed circumferentially between notches 772 and 774 when plate 780 is in its extreme counterclockwise adjusted position.

As best shown in FIGURE 22, roller 770 projects beyond the forward side face of cam 754 so that its left-hand end portion rides along surface 788 of plate 780. By adjusting plate 780 to the position shown in FIGURE 21 where recess 790 aligns with notch 772, roller 770 will ride into notches 771 and 772 but will not ride into notch 774. When plate 780 is swung to an extreme counterclockwise position where recess 790 is between notches 772 and 774, roller 770 only rides into notch 771 as cam 754 is rotated. By removing plate 780, roller 770 is permitted to ride into all three of the cam notches 771, 772, and 774. Thus it is clear from the foregoing that by adjusting or removing plate 780, the number of times solenoid 732 is pulsed and, consequently, the number of shots of solution supplied to tank 44 for each revolution of cam 752 may be selectively varied.

In the embodiment illustrated in FIGURE 23, the guide and feed roller construction described in the construction shown in FIGURES 1–22 is replaced with a multiple belt conveyor arrangement for recycling the document through imaging station 28. To the extent that the embodiments of FIGURE 23 and of FIGURES 1–22 are the same, like reference characters have been used to identify like parts.

As shown in FIGURE 23, a feed path 800 leading to imaging station 33 is formed by a pair of cooperating conveyors 802 and 804. Conveyor 804 comprises an endless belt 805 trained around an idler roller 806 which is rotatably mounted on frame 23 by suitable bearings (not shown). Roller 806 is located in the same position as roller assembly 218 of the previous embodiment and has its rotational axis extending perpendicular to the pivot axis of turn around guide 322. The upper run of belt 805 extends rearwardly and is trained around a tracking roll 808 which is rotatably mounted on frame 23 by suitable bearings (not shown) in parallel, horizontally spaced relation to roller 806.

From roll 808, the upper run of belt 805 extends forwardly and passes around an idler roll 810. Idler roll 810 is journalled on frame 23 in parallel relation with roll 808 and is disposed above and forwardly of roll 808 in the manner shown. From roll 810, belt 805 extends rearwardly again and is trained around a roller 812 rotatably mounted on frame 23 about an axis that is parallel with the rotational axis of roller 806. Roller 812 is located just forwardly of imaging station 33. From roller 812 the lower run of belt 805 extends forwardly to idler roller 806 and delimits the upper boundary of feed path 800.

With continued reference to FIGURE 23, conveyor 804 comprises an endless belt 814 which is trained around a turn around roll 816 located vertically below roller 806 in place of roller assembly 219 described in the embodiment of FIGURES 1–22. Roll 816 is mounted for rotation on frame 23 about an axis extending parallel to that of roller 806. The section of belt 814 passing around roll 816 delimits the inner boundary of throat 321 as shown.

The upper run of belt 814 delimiting the lower boundary of feed path 800 extends rearwardly from roll 816 and is trained over a pressure roller 818 which urges it into bearing engagement with the portion of belt 805 passing under roller 812. Roller 818 is rotatably mounted on frame 23 about an axis extending parallel to that of roll 816 and is disposed below roller 812 and forwardly of imaging station 33.

The upper run of belt 814, as shown in FIGURE 23, extends rearwardly from roll 818 and passes over another pressure roll 820 at imaging station 33. Roll 820 is mounted on frame 23 for rotation about an axis extending parallel to that of roll 818. The upper run of belt 814 passing through imaging station 33 is trained around a large turn around drive roll 822 which is also mounted on frame 23 for rotation about an axis extending parallel to roll 816. The lower run of belt 814 extends forwardly from roll 822 and is trained under a first tracking roll 824 and over a second tracking roll 826 which is disposed above roll 824. Rolls 824 and 826 are mounted for rotation on frame 23 about spaced apart axes extending parallel to that of roll 816 and are disposed between roll 822 and roll 818. The lower run of belt 814 extending forwardly from roll 826 passes under roll 818 and leads to roll 816.

Belts 805 and 814 are respectively continuously driven in counterclockwise and clockwise directions by chain 112 which is trained around sprocket wheels 828 and 830 respectively mounted on shafts 832 and 834. Shafts 832 and 834 respectively mount rolls 812 and 822.

With the foregoing conveyor construction, a document manually fed through slot 30 into feed path 800 is advanced between belts 805 and 814 toward imaging station 33. Belt 814 transports the document through station 33 to a rear turn around path 836 defined by the portion of belt 814 trained around roll 822 and by another endless belt 838. Belt 838, as shown in FIGURE 23, is trained around an upper idler roll 840 and extends partially around roll 822. Below roll 822, belt 838 is trained around a turn around roll 842. From roll 842 belt 838 extends rearwardly and is trained over a tracking roll 844. From tracking roll 844 belt 838 extends forwardly to roll 840. Rolls 840, 842, and 844 are mounted for rotation on frame 23 about spaced apart axes extending parallel to that of roll 822. As shown, roll 844 is disposed rearwardly of rolls 822, 840, and 842.

Belt 838 is driven by frictional engagement with belt 814, and the document advanced through imaging station 33 by belt 814 is fed between belts 814 and 838. The document emerging from path 836 is advanced past flipper 310 by belts 814 and 838. With flipper 310 in its full-line recycling position shown in FIGURE 23, the advancing document is picked up by a recycling conveyor 846 comprising an endless belt 848 trained around a tracking roll 850. Roll 850 is disposed vertically below roll 824 and forwardly of flipper 310 in the manner shown. The upper run of belt 848 extends forwardly from roll 850 and is trained around a front repeat roll 852 disposed vertically below roll 816. From roll 852, the lower run of belt 848 extends rearwardly and is trained around a repeat take up roll 854 located between rolls 850 and 852. From roll 854, belt 848 extends forwardly and is trained around another repeat take up roll 856. From roll 856, the lower run of belt 848 extends rearwardly to roll 850 as shown.

With continued reference to FIGURE 23, rolls 850, 852, 854, and 856 are mounted for rotation on frame 23 about spaced apart axes extending parallel to that of roll 816. Belt 848 is driven in a counterclockwise direction by frictional engagement with the lower run of belt 814. A recycling document picked up by conveyor 846 is advanced between belts 848 and 814 to throat 321 and is fed through throat 321 and into feed path 800 by belt 814.

If flipper 310 is positioned in its single copy position shown by dotted lines in FIGURE 23, the document emerging from path 836 is directed downwardly to the base of the printer and is not recycled by belt 848.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. In a duplicating machine, a duplicating station, guide means defining an endless path for cyclically routing a document to be copied through an exposure zone in said duplicating station, means for moving said document along said path and for feeding a plurality of sheets of copy paper seriatim through said duplicating station in timed relation with the movement of said document therethrough, means for copying said document on said sheets of copy paper fed through said duplicating station, means adapted to engage said document at least along its leading edge as it travels along said path, said document engaging means forming a part of said guide means for directing said document into a part of said endless path, and means for selectively adjusting the angle that said document engaging means extends with respect to the leading edge of the moving document approaching said document engaging means for varying the skew orientation of said original document relative to its direction of movement through said station as it is advanced for travel into said part of said endless path.

2. The duplicating machine defined in claim 1 wherein said means for selectively adjusting the angle that said document engaging means extends with respect to the leading edge of said moving document comprises manually operated means for swinging said document engaging means about an axis that extends transversely of said moving document as it approaches and is immediately adjacent to said document engaging means.

3. In a duplicating machine, a duplicating station, guide means defining an endless path for cyclically routing a document to be copied through an exposure zone in said duplicating station, means for moving said document along said path and for feeding a plurality of sheets of copy paper seriatim through said duplicating station in timed relation with the movement of said document therethrough, means for copying said document on said sheets of copy paper fed through said duplicating station, a turnaround guide forming a part of said guide means for substantially reversing the direction of travel of said document to re-route it through said duplicating station, and means for selectively adjusting the angle at which said turn-around guide extends with respect to the moving document approaching and immediately adjacent to said turn-around guide for varying the skew orientation of said document relative to its direction of travel as it engages said turn-around guide during its advancement along said endless path.

4. The duplicating machine defined in claim 3 wherein said means for adjusting the angle of said turn-around guide comprises means for pivotally mounting said turn around guide about an axis extending substantially normal to the direction of movement of said document towards said guide.

5. The duplicating machine defined in claim 4 wherein said means for adjusting the angle at which said guide extends comprises manually manipulatable means, and wherein means are provided for fixing said guide in an adjusted position.

6. The duplicating machine defined in claim 4 wherein said means for moving said document comprises a pair of cooperating pick-up rollers rotatably mounted about parallel axes and drive means for rotating said rollers to advance a document fed therebetween, said guide and one of said rollers being disposed to delimit an arcuate passage routing said document between said rollers.

7. The duplicating machine defined in claim 4 wherein said means for moving said document comprises a pair of cooperating pick-up rollers rotatably mounted about parallel axes, drive means for rotating said rollers to advance a document fed therebetween towards said duplicating station, said guide having an arcuate deflecting surface so disposed in spaced relation to the periphery of one of said rollers as to define an arcuate passage for guiding said document between said rollers, the pivot axis of said guide being substantially normal to the rotational axis of said one roller whereby pivotal movement of said guide renders said passage more narrow at one side of said one roller than at the other.

8. The duplicating machine defined in claim 7 comprising a feed shelf detachably mounted on said guide for supporting and guiding a document manually fed between said rollers for advancement along said path.

9. The duplicating machine defined in claim 8 wherein said feed shelf is formed with an upstanding side guide wall against which an edge of the document manually fed between said rollers is adapted to ride, and wherein means are provided for adjusting the position of said feed shelf to vary the angle at which said guide wall extends with respect to the rotational axes of said rollers independently of the pivotal adjustment of said guide.

10. The duplicating machine defined in claim 8 wherein said feed shelf is provided with an upstanding side guide wall extending transversely of the rotational axes of said rollers and against which a document manually fed between said rollers is adapted to ride, and wherein means are provided for adjustably swinging said feed shelf about an axis extending substantially parallel to the pivot axis of said guide and normal to the rotational axes of said rollers to selectively vary the angle at which said guide wall extends with respect to the rotational axes of said rollers.

11. The duplicating machine defined in claim 7 comprising a guide structure defining a feed back path section forming a part of said endless path and leading up to said arcuate passage, and means removably mounting said guide structure in place.

12. The duplicating machine defined in claim 11 wherein said guide structure comprises surface defining means providing a plurality of parallel edges extending parallel to the direction of document travel and being the sole surfaces on said structure normally engaging and guiding said traveling document.

13. The duplicating machine defined in claim 11 comprising gate means actuatable to eject the traveling document from said endless path, said guide structure defining an ejection path along which said document is routed by said gate means.

14. The duplicating machine defined in claim 1 comprising gate means formed separately of said document engaging means and being actuatable to eject the moving document from said endless path, and means for automatically actuating said gate means in response to a preselected number of passes of said document through said duplicating station.

15. The duplicating machine defined in claim 1 wherein said duplicating station comprises a further exposure zone located remote from the first named exposure zone and wherein means are provided for routing said copy paper along a further path that is separated from said endless path, said further exposure zone being located along said further path.

16. In a duplicating machine, a duplicating station, guide means defining an endless path for cyclically routing a document to be copied through an exposure zone in said duplicating station, said endless path being formed with a feed path section leading to said exposure zone and a feed back-path section for re-routing the document back into said feed path after it passes through said exposure zone, turn around guides forming a part of said guide means for so reversing the direction of travel of said document that it moves in substantially opposite directions along said feed path section and said feed back path section, means for advancing said document along said endless path and for feeding sheets of copy paper seriatim through said duplicating station in timed relation with the cyclic movement of said document through said exposure zone, means for copying said traveling document on the sheets of copy paper moving through said station, and means for adjusting the angle at which at least one of said turn-around guides extends with respect to the moving document approaching and immediately adjacent to said one turn-around guide for varying the skew orientation of the document relative to its direction of travel as said document engages said one turn-around guide during its advancement along said endless path.

17. In a duplicating machine, a casing, a duplicating station disposed in said casing and having an exposure zone, guide means defining an endless path in said casing for cyclically routing a document to be copied through said exposure zone and having a feed path section leading to said exposure zone and a feed back path section for re-routing the document from said exposure zone to said feed path section, means for feeding sheets of copy paper seriatim through said duplicating station in timed relation to the cyclic movement of said document through said exposure zone, means at said station for copying the moving document onto said sheets of copy paper moving through said duplicating station, a removably mounted unitary structure forming a part of said guide means for routing said document along said feed back path section, detachably supporting said unitary structure and including a fixed member, ears formed integral with said unitary structure and detachably hooking over said fixed member remotely from said one end of said structure, and a pair of leaf springs disposed on opposite sides of said structure and having free ends biased into engagement with oppositely facing notches formed in the sides of said structure, said springs being disengageable from said notches to free said unitary structure for detachment from said fixed member by manually pushing an end of said structure transversely of the direction of document travel along said feed back path section.

18. The duplicating machine defined in claim 17 comprising means providing an opening for removing said unitary structure from said casing.

19. The duplicating machine defined in claim 17 wherein said guide means comprises surface defining deflector means so disposed along said endless path as to route said traveling document along said feed back path section in a direction that is substantially opposite to the direction of movement of said document through said exposure zone.

20. The duplicating machine defined in claim 17 comprising gate means actuatable to eject said traveling document from said endless path, and means mounting said gate means between said exposure zone and said unitary structure with respect to the direction of travel of said document along said endless path.

21. The duplicating machine defined in claim 20 wherein said gate means comprises at least one pivotally mounted member disposed in one position for guiding said document along said endless path and being swingable to an ejection position where it blocks said endless path and routes said document out of said endless path.

22. The duplicating machine defined in claim 21 comprising surface defining means forming a part of said unitary structure and defining a path for guiding said document ejected from said endless path by said gate means.

23. The duplicating machine defined in claim 17 wherein said unitary structure comprises surface defining means providing a plurality of thin, laterally spaced apart straight, document guide edges extending parallel to the direction of movement of said document along said feed back path section and constituting substantially the only surfaces of said unitary structure guidingly engaging said document during normal operation.

24. The duplicating machine defined in claim 17 wherein said unitary structure comprises a base plate and a plurality of laterally spaced apart, thin, flat-sided fingers mounted on said plate and extending parallel to the direction of travel of said document along said feed back path section and each contained in a plane passing substantially normal to said document traveling along said feed back path section, said fingers having straight edges supporting and guiding said document moving along said feed back section.

25. The duplicating machine defined in claim 20 wherein said unitary structure comprises a base plate, a first plurality of fingers mounted on said base plate having laterally spaced apart, thin document guide and support edges delimiting said feed back path section and extending parallel to the direction of travel of said document along said feed back path section, a second plurality of second fingers mounted on said base plate and extending parallel to said first plurality of fingers, said second fingers having thin document guide and support edges delimiting a path into which said document is routed when ejected from said endless path by said gate means.

26. In an electrostatic printer, guide means defining a path for conveying a document to be copied through an exposure zone in a duplicating station and comprising roller means disposed along said path at spaced apart regions for propelling said document along an upwardly facing, generally horizontal surface of a unitary structure, having a plurality of laterally spaced apart support fingers of electrically conductive material forming a part of said guide means and having thin coextensive, longitudinally extending edges for supporting said traveling document as it moves from one roller means to the next means mounting said fingers with said edges extending substantially parallel to the direction of movement of said document therealong and plate means mounted between said fingers for engaging and lifting up dog ears on said document.

27. The duplicating machine defined in claim 26 comprising a plate mounting said fingers, a frame, and means mounting said plate on said frame and permitting limited expansion of said plate longitudinally and transversely with respect to said fingers, said fingers comprising thin, flatsided plate members contained in spaced apart, parallel planes.

28. In a duplicating machine, a frame, a duplicating station, guide means mounted on said frame for conveying a document to be copied along a feed path passing through an exposure zone at said station, means for advancing said document along a substantially straight line of travel through said feed path and for feeding at least one sheet of copy paper through said duplicating station in timed relation to the advancement of said document through said exposure zone, a feed shelf for supporting and guiding a document manually inserted into said feed path and comprising a plate portion having a flat document support surface, an upstanding wall having a straight guide surface against which the side edge of a document slid along said support surface is adapted to ride, said wall being rigid with said plate portion and extending along a side edge of said support surface at right angles thereto, and means adjustably mounting said feed shelf on said frame for varying the angle at which said upstanding wall extends with respect to the line of document travel along said feed path to thereby provide a guide by which the orientation of the document manually fed into said path may be varied with respect to said line of travel along said path.

29. The duplicating machine defined in claim 28 wherein said means adjustably mounting said feed shelf comprises a bracket supported from said frame, means pivotally mounting said feed shelf on said bracket for swinging movement about an axis extending substantially perpendicular to said support surface, means for fixing said shelf in a selected angular position on said bracket, and means for adjustably displacing said feed shelf transversely of said line of travel independently of the angular adjustment of said feed shelf.

30. The duplicating machine defined in claim 28 wherein said means adjustably mounting said feed shelf comprises a bracket detachably supported from said frame and having spaced apart slots extending along a common axis passing at right angles to said guide surface, a pair of parallel, laterally spaced apart posts fixed to said shelf and extending through respective ones of said slots along axes extending at right angles to said support surface, one of said posts being so dimensioned as to slidably engage the opposed side edge of its associated slot and the other of said posts being so dimensioned as to provide a predetermined clearance with the opposed side edges of its associated slot, and means mounted on said other post for selectively rocking said feed shelf about the axis of said one post.

31. The duplicating machine defined in claim 30 wherein said means mounted on said other post comprises manually manipulatable eccentric means.

32. In an electrostatic printer guide means defining a path for conveying a document to be copied through an exposure zone in a duplicating station, said guide means comprising roller means disposed along said document path at spaced apart locations for propelling said document along the top of a unitary structure, said unitary structure comprising a plurality of laterally spaced apart support fingers of electrically conductive material forming a part of said guide means and having thin coextensive, longitudinally extending edges for supporting said travelling document as it moves from one roller means to the next, and means mounted between said fingers for engaging and lifting up dog ears on said document, said means for engaging and lifting up said dog ears comprising an arcuate plate fixed between at least two adjacently disposed ones of said fingers and having a concave document dog ear engaging surface.

References Cited

UNITED STATES PATENTS

| | | | |
|---|---|---|---|
| 1,908,845 | 5/1933 | Hopkins | 271—53 |
| 1,912,708 | 6/1933 | Hopkins | 271—8 |
| 2,435,099 | 1/1948 | Pratt | 88—24 |
| 2,472,931 | 6/1949 | Yohn | 88—24 |
| 2,478,641 | 8/1949 | Rose | 88—24 |
| 2,492,127 | 12/1949 | Hessert | 88—24 |
| 2,574,215 | 11/1951 | Kunstadter | 95—77.5 |
| 2,617,647 | 11/1952 | Davis | 271—49 |
| 2,632,360 | 3/1953 | Eaton | 88—24 |
| 2,684,656 | 7/1954 | Ransburg | 118—51 |
| 2,697,378 | 12/1954 | Sexton | 88—24 |
| 3,091,169 | 5/1963 | Taini | 95—77.5 |
| 3,181,420 | 5/1965 | Rautbord | 88—24 |

JOHN M. HORAN, *Primary Examiner.*

CERTIFICATE OF CORRECTION

Patent No. 3,330,179                          July 11, 1967

Arthur S. Zerfahs et al.

It is hereby certified that error appears in the above numbered patent requiring correction and that the said Letters Patent should read as corrected below.

In the drawings, a lead line should be applied in Figure 7 from reference numeral "334" to the bar thereabove; the reference numeral "420" in Figure 14 should be -- 412 --; the reference numeral "422" in the upper left-hand corner of Figure 2 should be deleted; the reference numeral "126" without a lead line adjacent the upper right corner of stack 25 in Figure 3 should be deleted; the reference numeral "294" without a lead line below "281" should be deleted in Figure 3; the reference numeral "754" applied to the shaft in the right-hand portion of Figure 21 should be -- 752 --; column 2, line 9, after "recycled" insert -- , and --; column 3, line 28, after "5-5" insert -- of FIGURE 6 --; lines 30 and 34, for "FIGURE 6", each occurrence, read -- FIGURE 4 --; column 7, line 25, for "roller" read -- Roller --; column 10, line 9, for "screw 336" read -- screw 337 --; column 11, line 43, for "a" read -- an --; column 14, line 34, for "cylinrical" read -- cylindrical --; line 44, for "ably" read -- able --; column 15, line 11, after "this" insert -- ready position is spaced from rollers 124 and 125 --; line 25, for "590" read -- 586, 590, and 592 --; column 17, line 27, for "plate" read -- slate --; line 34, for "areas," read -- areas --; line 35, for "strikes" read -- strikes, --; line 51, for "switcth" read -- switch --; column 18, line 56, for "de-energizes" read -- de-energize --; same line 56, for "energizes" read -- energize --; column 19, line 29, for "me" read -- ment --; column 20, line 59, for "foward" read -- forward --; column 23, line 1, after "member" insert -- 708 --; column 29, line 46, after "section," insert -- and means for --; column 30, line 44, after "structure," insert -- said unitary structure --.

Signed and sealed this 16th day of July 1968.

(SEAL)
Attest:

EDWARD M. FLETCHER, JR.
Attesting Officer

EDWARD J. BRENNER
                                                 Commissioner of Patents